US012580409B2

(12) United States Patent
Fujita et al.

(10) Patent No.: US 12,580,409 B2
(45) Date of Patent: Mar. 17, 2026

(54) OPERATION METHOD, OPERATION DEVICE, AND OPERATION SYSTEM OF BATTERY, AND NON-TRANSITORY STORAGE MEDIUM

(71) Applicant: KABUSHIKI KAISHA TOSHIBA, Tokyo (JP)

(72) Inventors: Yumi Fujita, Tokyo (JP); Tomokazu Morita, Funabashi (JP); Nobukatsu Sugiyama, Kawasaki (JP); Shoko Miyazaki, Kawasaki (JP); Wen Zhang, Sagamihara (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 45 days.

(21) Appl. No.: 18/581,725

(22) Filed: Feb. 20, 2024

(65) Prior Publication Data

US 2025/0030260 A1     Jan. 23, 2025

(30) Foreign Application Priority Data

Jul. 18, 2023    (JP) ................................. 2023-116978
Nov. 16, 2023    (JP) ................................. 2023-195430

(51) Int. Cl.
| | |
|---|---|
| *H02J 7/00* | (2006.01) |
| *B60L 58/12* | (2019.01) |
| *H01M 10/44* | (2006.01) |

(52) U.S. Cl.
CPC .......... *H02J 7/00712* (2020.01); *B60L 58/12* (2019.02); *H01M 10/44* (2013.01); *H02J 7/0048* (2020.01); *H02J 7/0063* (2013.01); *H01M 2220/20* (2013.01)

(58) Field of Classification Search
CPC .... H02J 7/00712; H02J 7/0048; H02J 7/0063; B60L 58/12; H01M 10/44; H01M 2220/20
See application file for complete search history.

(56) References Cited

U.S. PATENT DOCUMENTS

| | | | |
|---|---|---|---|
| 10,938,075 B2 | 3/2021 | Fujita et al. |
| 11,201,486 B2 | 12/2021 | Fujita et al. |
| 11,243,261 B2 | 2/2022 | Fujita et al. |

(Continued)

FOREIGN PATENT DOCUMENTS

| | | |
|---|---|---|
| EP | 3902088 A1 | 10/2021 |
| JP | 2018156739 A | 10/2018 |

(Continued)

OTHER PUBLICATIONS

Extended Search Report issued on Sep. 30, 2024, in corresponding European Application No. 24157325.2, 9 pages.

(Continued)

*Primary Examiner* — Rexford N Barnie
*Assistant Examiner* — Duc M Pham
(74) *Attorney, Agent, or Firm* — Maier & Maier, PLLC

(57) ABSTRACT

In an operating method of a battery in an embodiment, one of a plurality of SOC ranges shifted from each other is selected as an operation SOC range, and the battery is operated in the SOC range selected as the operation SOC (Continued)

1 range. In the operation method, the SOC range selected as the operation SOC range is sequentially switched between the plurality of SOC ranges.

20 Claims, 8 Drawing Sheets

(56) References Cited

U.S. PATENT DOCUMENTS

| | | | |
|---|---|---|---|
| 2018/0267108 A1 | 9/2018 | Morita et al. | |
| 2023/0015417 A1* | 1/2023 | Fujita | H01M 4/485 |
| 2023/0391221 A1* | 12/2023 | Matsuda | H02J 7/0071 |
| 2024/0230782 A1 | 7/2024 | Fujita et al. | |
| 2025/0015625 A1* | 1/2025 | Lee | H01M 10/425 |
| 2025/0030256 A1 | 1/2025 | Fujita et al. | |

FOREIGN PATENT DOCUMENTS

| | | |
|---|---|---|
| JP | 2019057382 A | 4/2019 |
| JP | 2020145816 A | 9/2020 |
| JP | 2021048663 A | 3/2021 |
| JP | 202497201 A | 7/2024 |
| JP | 2025014429 A | 1/2025 |
| WO | 2021205642 A1 | 10/2021 |
| WO | 2022091894 A1 | 5/2022 |
| WO | 2022209343 A1 | 10/2022 |
| WO | 2022220214 A1 | 10/2022 |
| WO | 2022264698 A1 | 12/2022 |

OTHER PUBLICATIONS

Kobayashi et al., "Unexpected capacity fade and recovery mechanism of LifePO4/graphite cells for grid operation"; Journal of Power Sources, vol. 449, 2020, 227502; 6 pages.
"LFP to overtake NMC as dominant stationary storage chemistry by 2030"; Wood Machenzie, Aug. 17, 2020; https://www.woodmac.com/press-releases/lfp-to-overtake-nmc-as-dominant-stationary-storage-chemistry-by-2030/ 3 pages.
Onishi et al., "VW-supported Chinese Guoxian executeve: 70% of EVs will use inexpensive iron phosphate batteries"; Nikkei Business; Aug. 22, 2022; https://business.nikkei.com/atcl/gen/19/00122/081900141/?P=2 15 pages.
"Power Batteries Transforming with Cell-to-Pack (Industry Outlook)"; FINTOS!; Apr. 19, 2022 https://fintos.jp/page/48494 8 pages.
"Cathode Materials for EV Batteries, NMC or LFP: Which is Right for You?"; EE Times Japan; Jan. 20, 2023; https://eetimes.itmedia.co.jp/ee/articles/2301/20/news165.html 8 pages.
"Investigation of Degradation Behavior of Lithium-Ion Battery"; Survey Report, Center for Low Carbon Society Strategy, Japan Science and Technology Agency; Mar. 2020 https://www.jst.go.jp/lcs/pdf/fy2019-sr-01.pdf 36 pages.

* cited by examiner

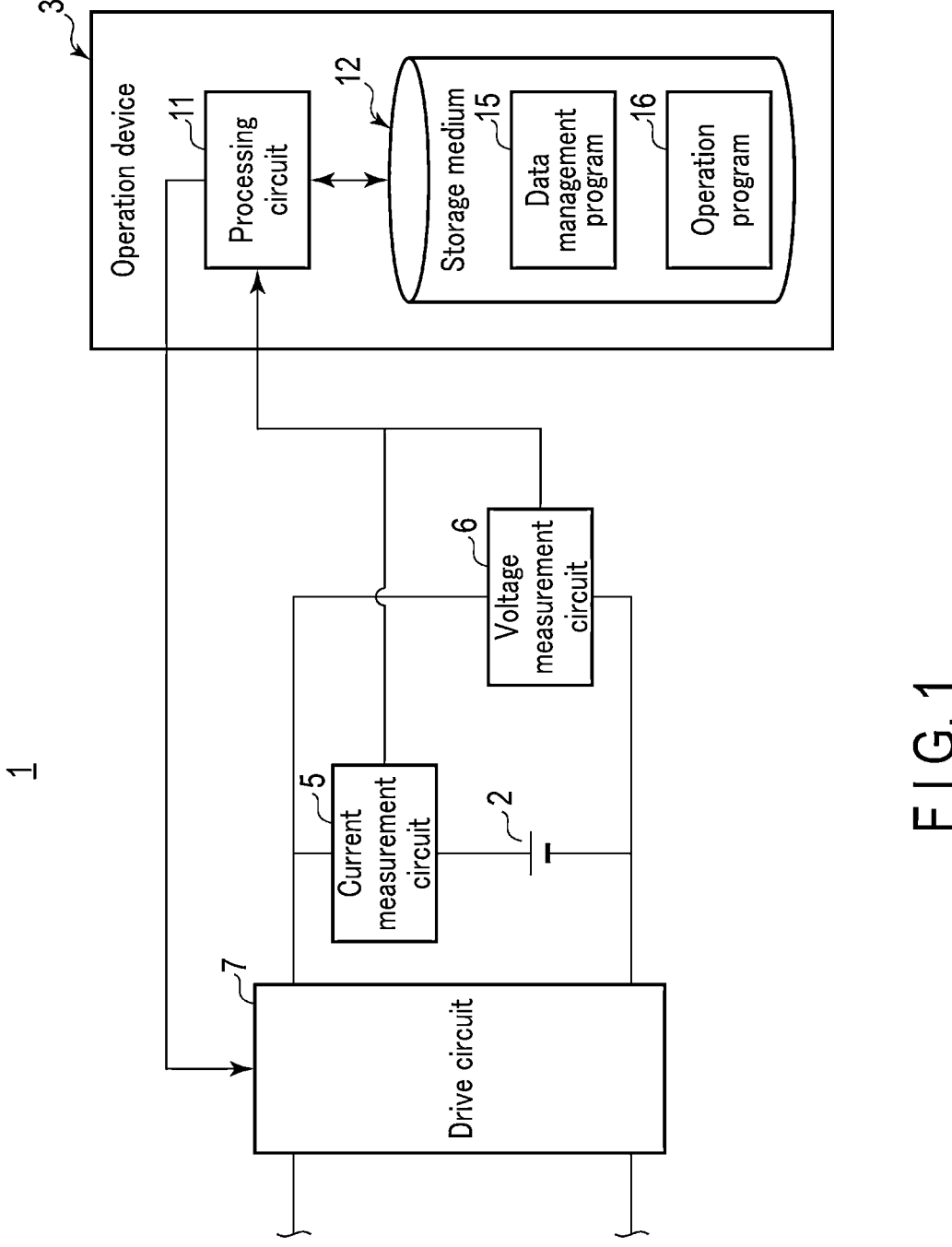
F I G. 1

|  | Median SOC value $\eta c$ | Upper limit SOC value $\eta u$ | Lower limit SOC value $\eta l$ | SOC width $\Delta \eta$ |
|---|---|---|---|---|
| SOC range X1 | $\eta c1$ | $\eta u1$ | $\eta l1$ | $\Delta \eta 1$ |
| SOC range X2 | $\eta c2 (< \eta c1)$ | $\eta u2 (< \eta u1)$ | $\eta l2 (< \eta l1)$ | $\Delta \eta 2$ |
| SOC range X3 | $\eta c3 (> \eta c1)$ | $\eta u3 (> \eta u1)$ | $\eta l3 (> \eta l1)$ | $\Delta \eta 3$ |
F I G. 2
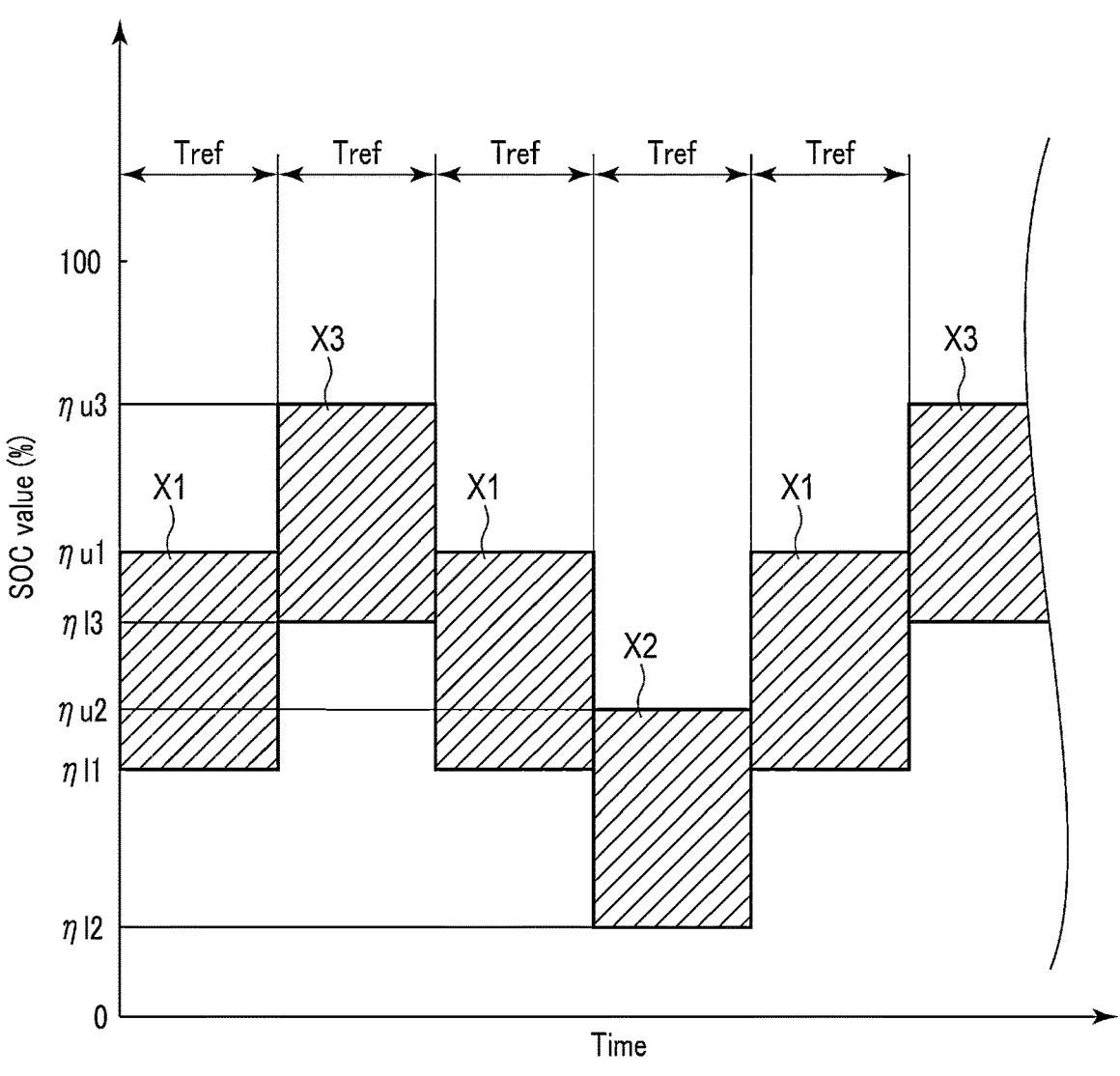
F I G. 3

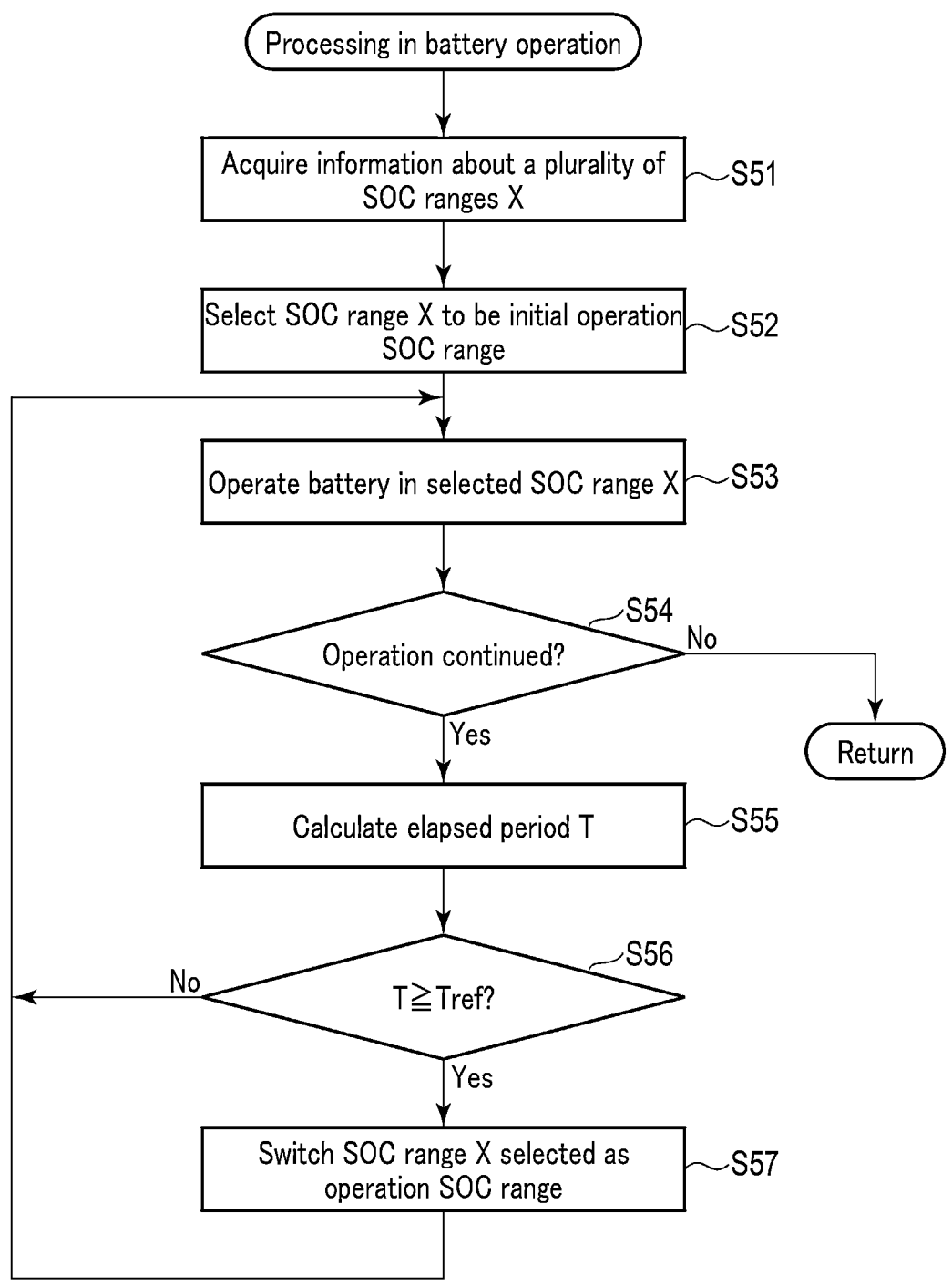
F I G. 4

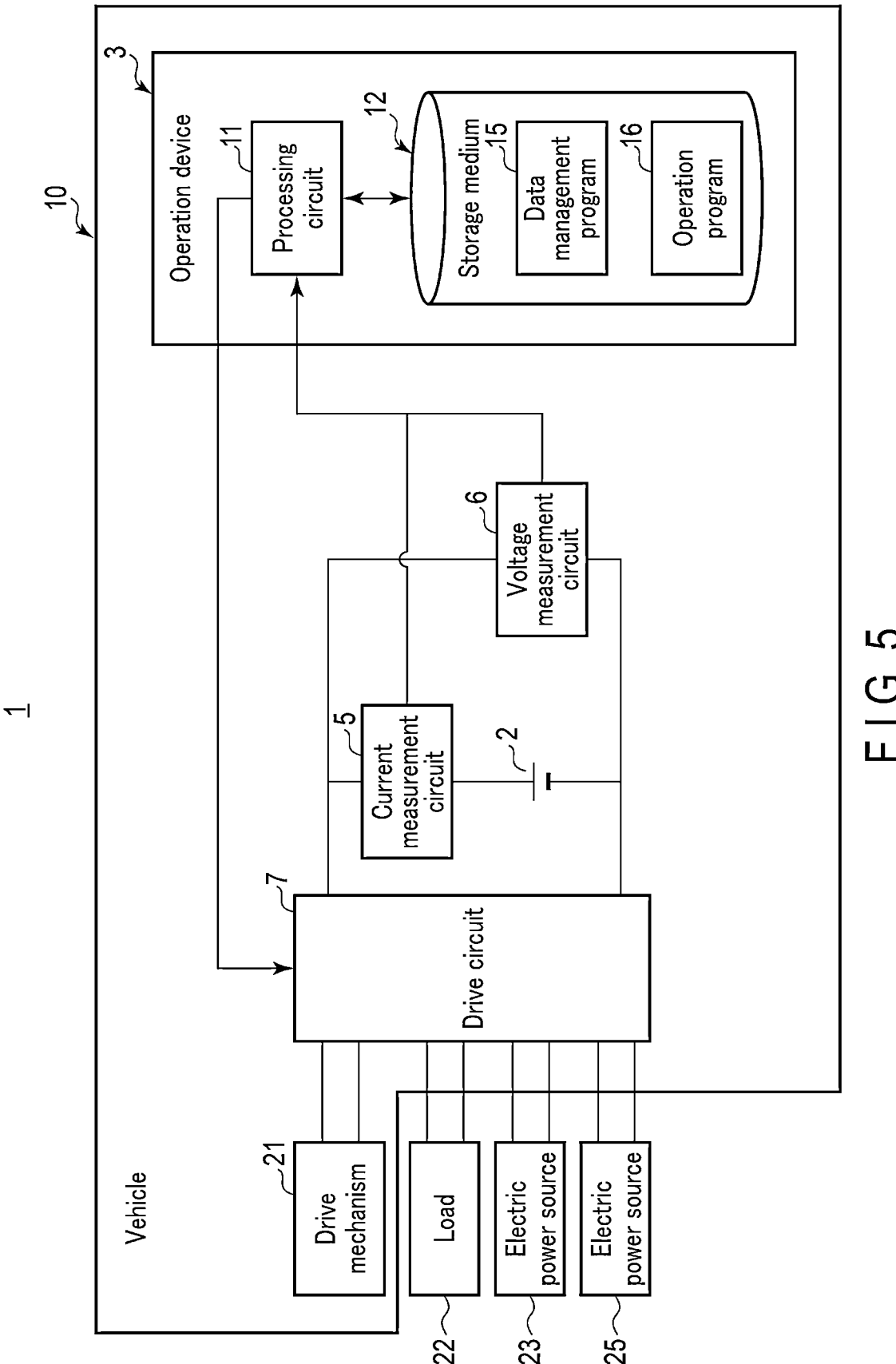
F I G. 5

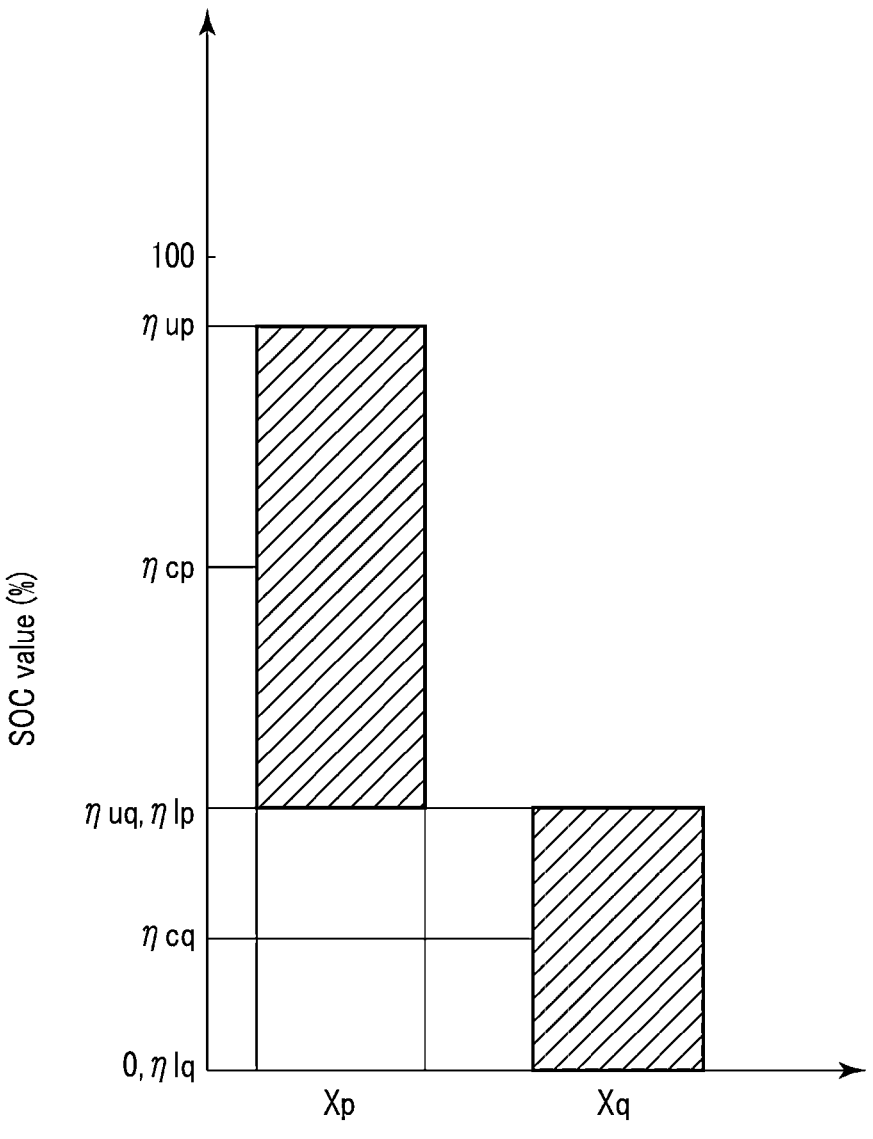
F I G. 6

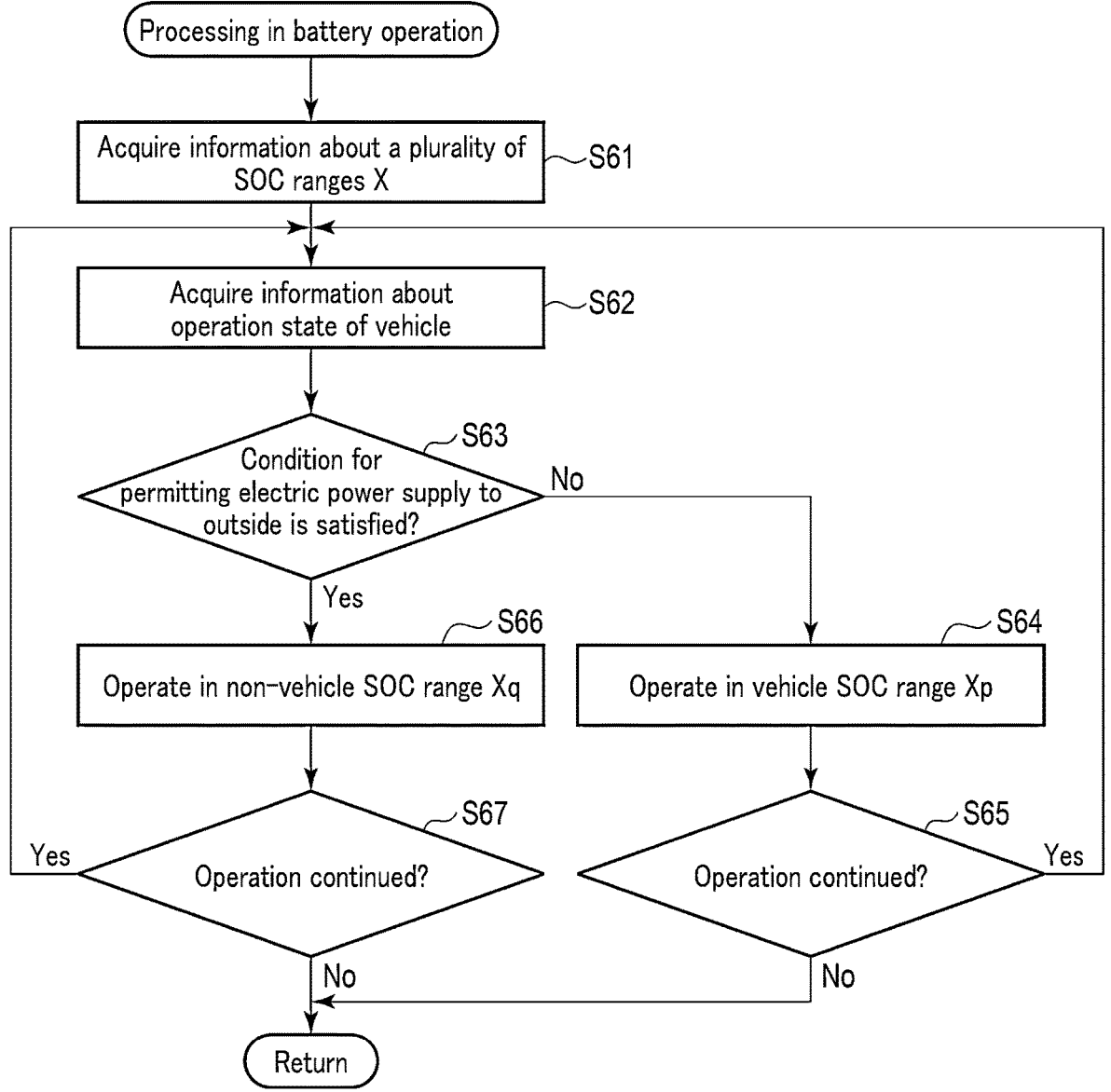
F I G. 7

OPERATION METHOD, OPERATION DEVICE, AND OPERATION SYSTEM OF BATTERY, AND NON-TRANSITORY STORAGE MEDIUM

CROSS-REFERENCE TO RELATED APPLICATIONS

This application is based upon and claims the benefit of priority from Japanese Patent Application No. 2023-116978, filed Jul. 18, 2023; and No. 2023-195430, filed Nov. 16, 2023, the entire contents of all of which are incorporated herein by reference.

FIELD

Embodiments described herein relate generally to an operation method, an operation device, and an operation system of a battery, and a non-transitory storage medium.

BACKGROUND

A battery such as a secondary battery is charged and discharged in an SOC range whose SOC width is relatively small, such as a range whose SOC width is 50% or less, depending on a usage mode or the like. The progress of deterioration of the battery may be accelerated in a case where the battery is repeatedly charged and discharged only in a specific Soc range whose SOC width is relatively small more than in a case where the battery is repeatedly charged and discharged with the SOC width of SOC 0 to 100% depending on the type of the electrode active material used in the battery. In the operation of a battery, it is required to appropriately reduce the progress of deterioration of the battery even in a usage mode in which the battery is charged and discharged in an Soc range whose SOC width is relatively small. In addition, in a usage mode in which a battery is charged and discharged in an SOC range whose SOC width is relatively small, it is required that the battery is appropriately operated while appropriately reducing the progress of deterioration of the battery.

BRIEF DESCRIPTION OF DRAWINGS

FIG. 1 is a schematic diagram illustrating an example of an operation system according to the embodiment.

FIG. 2 is a schematic diagram illustrating an example of a plurality of SOC ranges set by a processing circuit or the like of the operation device in the embodiment.

FIG. 3 is a schematic diagram illustrating an example of processing of switching an SOC range selected as an operation SOC range, the switching process being performed by a processing circuit or the like of the operation device in the embodiment.

FIG. 4 is a flowchart schematically illustrating an example of processing in the operation of the battery, the processing being performed by a processing circuit or the like of the operation device in the embodiment.

FIG. 5 is a schematic diagram illustrating an example of an operation system according to a modification.

FIG. 6 is a schematic diagram illustrating an example of a vehicle SOC range and a non-vehicle Soc range set by a processing circuit or the like of the operation device in the modification of FIG. 5.

FIG. 7 is a flowchart schematically illustrating an example of processing in the operation of the battery, the processing being performed by a processing circuit or the like of the operation device in the modification of FIG. 5.

DETAILED DESCRIPTION

Figure 8:
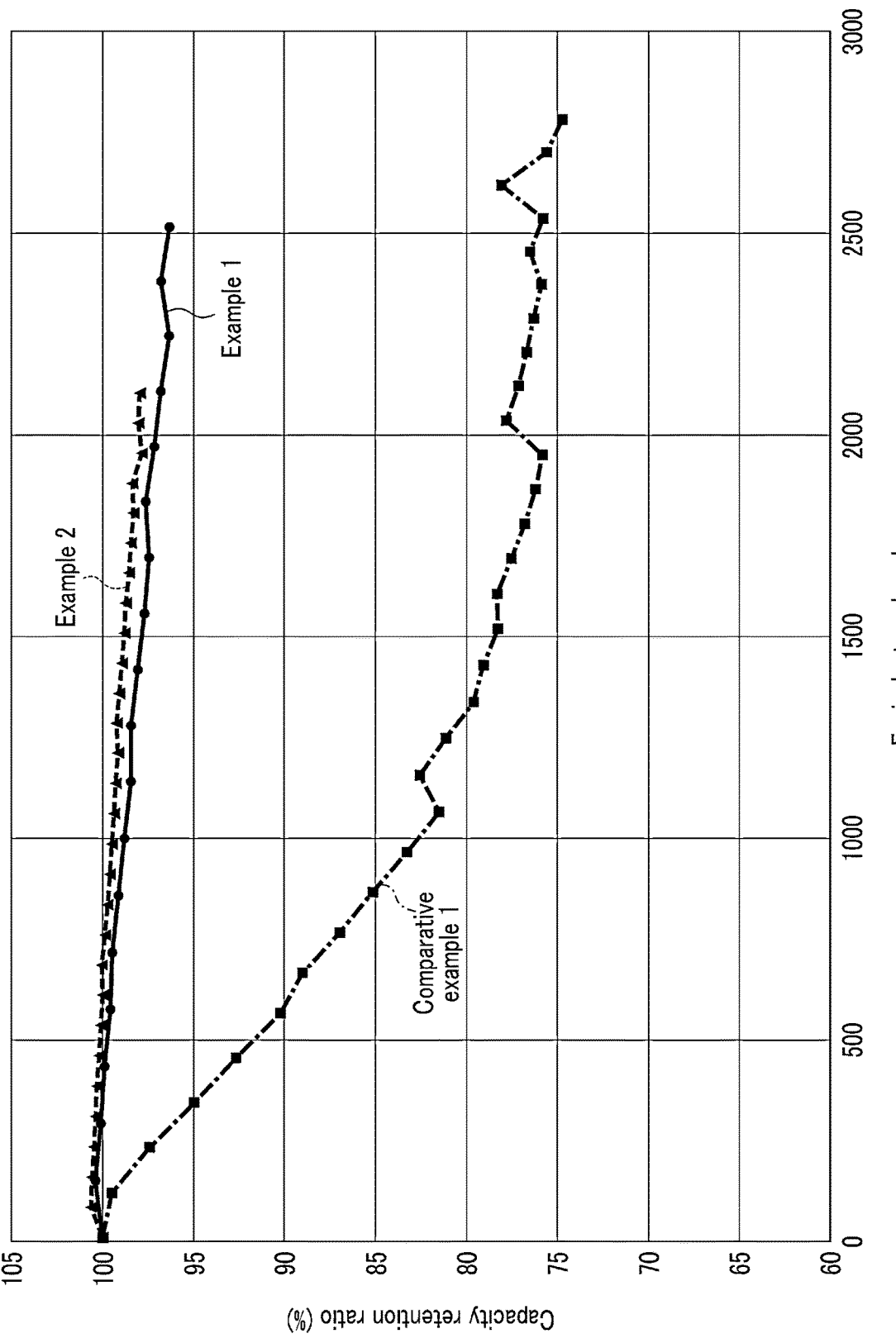
FIG. 8 is a schematic diagram illustrating a temporal change in the capacity retention ratio of the battery capacity in each of Comparative Example 1, Example 1, and Example 2 as a verification result in the first verification.

In the operating method of the battery according to the embodiment, one of the plurality of SOC ranges shifted from each other is selected as the operation SOC range, and the battery is operated in the SOC range selected as the operation SOC range. In the operation method, the SOC range selected as the operation SOC range is sequentially switched between the plurality of SOC ranges.

Hereinafter, embodiments and the like will be described with reference to the drawings.

FIG. 1 illustrates an example of an operation system 1 according to an embodiment. The operation system 1 includes a battery 2 and an operation device 3. The battery 2 is, for example, a secondary battery such as a lithium ion secondary battery. The battery 2 may be formed of a unit cell (unit cell), or may be a battery module or a cell block formed by electrically connecting a plurality of unit cells. When the battery 2 is formed of a plurality of unit cells, in the battery 2, the plurality of unit cells may be electrically connected in series, or the plurality of unit cells may be electrically connected in parallel. In the battery 2, both a series connection structure in which a plurality of unit cells is connected in series and a parallel connection structure in which a plurality of unit cells is connected in parallel may be formed. In addition, the battery 2 may be any of a battery string, a battery array, and a storage battery, in which a plurality of battery modules is electrically connected.

In the battery 2, an amount of charge (charge level) and an SOC value are defined as parameters indicating a state of charge. Then, for the battery 2, the amount of charge in real time is calculated based on the amount of charge at a predetermined time point, a temporal change in current from the predetermined time point, and the like. For example, for the battery 2, the amount of charge in real time is calculated by adding the time integrated value of the current from a predetermined time point to the amount of charge at the predetermined time point.

In the battery 2, a lower limit voltage Vmin and an upper limit voltage Vmax are defined for the voltage. In the battery 2, a state in which the voltage in discharging or charging under a predetermined condition is the lower limit voltage Vmin is defined as a state in which the SOC value is 0%, and a state in which the voltage in discharging or charging under a predetermined condition is the upper limit voltage Vmax is defined as a state in which the SOC value is 100%. In the battery 2, a charge capacity (amount of charge) until the SOC value changes from 0% to 100% in charging under a predetermined condition, or a discharge capacity (amount of discharge) until the SOC value changes from 100% to 0% in discharging under a predetermined condition is defined as the battery capacity. For the battery 2, the ratio of the residual amount of charge (residual capacity) until the SOC value is 0% with respect to the battery capacity is the SOC value.

Since the SOC value of the battery 2 is defined as described above, the SOC value in real time of the battery 2 can be calculated in a state where the battery 2 is operated by charging and discharging the battery 2. It is also possible to calculate the real time SOC value of the battery 2 from the real time open circuit voltage of the battery 2 based on the relationship between the open circuit voltage of the battery 2 and the SOC value. The calculation of the SOC value using the time-integrated value of the current can be used in combination with another method of calculating the soc value such as the calculation of the SOC value based on the open circuit voltage. In this case, a more accurate SOC value can be calculated.

The battery 2 includes a positive electrode active material and a negative electrode active material as electrode active materials. In an example of the embodiment, lithium iron phosphate (LFP) is used as the positive electrode active material of the battery 2. In this case, as the negative electrode active material, for example, any of a carbonaceous material, a titanium-containing oxide, a silicon-based negative electrode material, and the like, or a mixed material thereof is used. In an example, the battery 2 is operated while being mounted on a battery-mounted device (not shown). Examples of the battery-mounted device on which the battery 2 is mounted include a large power storage device for a power grid, a smartphone, a vehicle, a stationary power source device, a robot, a drone, and the like.

In an example of FIG. 1, the operation system 1 includes a current measurement circuit 5 and a voltage measurement circuit 6. The current measurement circuit 5 measures a current flowing through battery 2, and voltage measurement circuit 6 measures a voltage of battery 2. In the operation system 1, the current measurement circuit 5, the voltage measurement circuit 6, and the like constitute a measurement unit, and the measurement unit measures parameters related to the battery 2 including current and voltage. In an example, the measurement unit may include a temperature sensor or the like in addition to the current measurement circuit 5 and the voltage measurement circuit 6, and measure the temperature of the battery 2 in addition to the current and the voltage of the battery 2. The measurement unit periodically measures parameters related to the battery 2 such as current and voltage of battery 2. Therefore, as a measurement result by the measurement unit, it is possible to acquire a temporal change in a parameter related to the battery 2 including a temporal change (time history) in the current of the battery 2, a temporal change (time history) in the voltage of the battery 2, and the like. When the battery 2 is configured by series connection of a plurality of unit cells, a cell balancer for adjusting an SOC difference between the plurality of unit cells may be introduced together with voltage measurement circuit 6. When the battery 2 has a configuration in which a plurality of unit cells is connected in parallel and the plurality of parallel cells connected in parallel are connected in series, a cell balancer for adjusting an soc difference between the plurality of parallel cells may be introduced together with voltage measurement circuit 6.

In addition, the operation system 1 includes a drive circuit 7, and the battery 2 is electrically connected to an electric power source, a load (both not illustrated), and the like via the drive circuit 7. electric power from the electric power source or the like is input to the battery 2 through the drive circuit 7, whereby the battery 2 is charged. Then, electric power is output from the battery 2 to a load or the like through the drive circuit 7, whereby the battery 2 is discharged.

The operation device 3 performs processing related to the operation of the battery 2, and performs, for example, control of charging and discharging of the battery 2, management of an operation SOC range which is an SOC range in which the battery 2 is operated, and the like. In an example, the operation device 3 includes a processing device (computer) such as a server, and includes a processing circuit 11 and a storage medium (non-transitory storage medium) 12. The processing circuit 11 includes a processor, an integrated circuit, or the like, and the processor or the like constituting the processing circuit 11 includes any of a central processing unit (CPU), an application specific integrated circuit (ASIC), a microcomputer, a field programmable gate array (FPGA), a digital signal processor (DSP), and the like. The processing circuit 11 may include one processor or the like, or may include a plurality of processors or the like. The storage medium 12 is either a main storage device such as a memory or an auxiliary storage device. The operation device 3 may include only one memory or the like serving as the storage medium 12, or may include a plurality of memories or the like.

The processing circuit 11 performs processing by executing a program or the like stored in the storage medium 12. In an example of FIG. 1, the storage medium 12 stores a data management program 15 and an operation program 16 as programs to be executed by the processing circuit 11. The processing circuit 11 executes the data management program 15 to write data to the storage medium 12 and read data from the storage medium 12. The processing circuit 11 executes the operation program 16 to perform processing related to the operation of the battery 2 described later.

In an example, the operation device 3 includes a plurality of processing devices (computers) such as a plurality of servers, and the processors of the plurality of processing devices cooperate to perform processing related to the operation of the battery 2 described later. In another example, the operation device 3 is a cloud server in a cloud environment. The infrastructure of the cloud environment includes a virtual processor such as a virtual CPU and a cloud memory. Therefore, in a case where the operation device 3 is a cloud server, the virtual processor performs processing described later in the operation of the battery 2 instead of the processing circuit 11. The cloud memory has a function of storing programs, data, and the like, as in the storage medium 12.

The processing circuit 11 controls charging and discharging of the battery 2 by controlling driving of the drive circuit 7. The processing circuit 11 controls driving of the drive circuit 7 to switch between a state in which electric power is input to the battery 2 and a state in which electric power is output from the battery 2. In addition, in a state where electric power is input to the battery 2, the processing circuit 11 adjusts the magnitude of a charge current or the like, which is a current input to the battery 2, by controlling driving of the drive circuit 7. Then, in a state where electric power is output from the battery 2, the processing circuit 11 adjusts the magnitude of a discharge current or the like, which is a current output from the battery 2, by controlling driving of the drive circuit 7.

The processing circuit 11 acquires a measurement result by the measurement unit regarding the parameter related to the battery 2. Therefore, the processing circuit 11 acquires the measurement result of the current of the battery 2 by the current measurement circuit 5 and the measurement result of the voltage of the battery 2 by the voltage measurement circuit 6. Then, the processing circuit 11 controls driving of the drive circuit 7 and controls charging, discharging, and the like of the battery 2 based on the measurement result of the current, the voltage, and the like of the battery 2. For example, the processing circuit 11 calculates a temporal change in the current of the battery 2, a temporal change in the voltage of the battery 2, and the like from the measurement result by the measurement unit. Then, the processing circuit 11 controls charging, discharging, and the like of the battery 2 based on a temporal change in the current of the battery 2, a temporal change in the voltage of the battery 2, and the like.

In addition, the processing circuit 11 calculates the real time SOC value of the battery 2 and the temporal change (time history) in the SOC value of the battery 2 using the measurement results of the current and the voltage of the battery 2 and the like. The SOC value of the battery 2 is calculated using any of the methods described above. The processing circuit 11 controls driving of the drive circuit 7 and controls charging, discharging, and the like of the battery 2 based on the real time SOC value and the calculation result of the temporal change in the SOC value.

In an example, the operation system 1 is provided with a user interface (not shown). In this case, the user interface receives an operation or the like related to the operation of the battery 2 from the user or the like of the operation system 1. Therefore, the user interface includes any of a button, a mouse, a touch panel, a keyboard, and the like as an operating unit to which an operation is input by the user or the like. The user interface includes a notifier that makes notification of information related to an operation of the battery 2. The notifier makes notification of information by any of screen display, transmission of sound, and the like. Note that the user interface may be integrated with the processing device constituting the operation device 3, or may be provided separately from the processing device constituting the operation device 3.

Hereinafter, processing performed by the processing circuit 11 or the like of the operation device 3 in the operation of the battery 2 will be described. The processing circuit 11 executes the operation program 16 to perform the following processing. In the present embodiment, in the operation of the battery 2, the processing circuit 11 sets a plurality of SOC ranges X shifted from each other as an option of the operation soc range in which the battery 2 is operated. It is preferable that three or more SOC ranges X to be the option of the operation SOC range are set.

In each of the plurality of set SOC ranges X, a median SOC value $\eta c$, an upper limit SOC value $\eta u$, and a lower limit SOC value $\eta l$ are defined. In each of the SOC ranges X, the upper limit SOC value $\eta u$ is the upper limit of the SOC range, and the lower limit SOC value $\eta l$ is the lower limit of the SOC range. In each of the SOC ranges X, the median SOC value $\eta c$ is the center of the SOC range, and the median SOC value $\eta c$ corresponds to an addition average value of the upper limit SOC value $\eta u$ and the lower limit SOC value $\eta l$. The processing circuit 11 or the like sets the SOC range X so as to be in a state where between the plurality of SOC ranges X, the median SOC values $\eta c$ are different, the upper limit SOC values $\eta u$ are different, and the lower limit SOC values $\eta l$ are different.

FIG. 2 illustrates an example of a plurality of SOC ranges X set by the processing circuit 11 or the like of the operation device 3 in the embodiment and the like. In an example of FIG. 2, three SOC ranges X1 to X3 are set as an option of the operation SOC range. The median SOC value $\eta c2$ of the SOC range X2 is lower than the median SOC value $\eta c1$ of the SOC range X1, and the median SOC value $\eta c3$ of the SOC range X3 is higher than the median Soc value $\eta c1$ of the SOC range X1. The upper limit SOC value $\eta u2$ of the SOC range X2 is lower than the upper limit SOC value $\eta u1$ of the SOC range X1, and the upper limit SOC value $\eta u3$ of the SOC range X3 is higher than the upper limit SOC value $\eta u1$ of the SOC range X1. The lower limit SOC value $\eta l2$ of the SOC range X2 is lower than the lower limit SOC value $\eta l1$ of the SOC range X1, and the lower limit SOC value $\eta l3$ of the SOC range X3 is higher than the lower limit SOC value $\eta l1$ of the soc range X1.

Since the SOC ranges X1 to X3 are set as described above, the SOC ranges X1 to X3 are shifted from each other in an example of FIG. 2. In an example of FIG. 2, the SOC range X3 is a highest SOC range Xmax highest among the set SOC ranges X1 to X3. The SOC range X2 is a lowest SOC range Xmin lowest among the set SOC ranges X1 to X3.

An SOC width $\Delta\eta$ corresponding to a width from the upper limit SOC value nu to the lower limit SOC value $\eta1$ is defined in the SOC range X set as the option of the operation SOC range. In an example of FIG. 2, an SOC width $\Delta\eta1$ of the Soc range X1, an SOC width $\Delta\eta2$ of the SOC range X2, and an SOC width $\Delta\eta3$ of the SOC range X3 are defined. In the setting of the SOC range X, the SOC widths $\Delta\eta$ may be the same between the plurality of Soc ranges X, or the SOC widths $\Delta\eta$ may be different between the plurality of SOC ranges X.

Depending on a usage mode of the battery 2, the battery 2 may be charged and discharged in an SOC range whose SOC width is relatively small, such as a range whose SOC width is 50% or less. In such a case, the SOC width $\Delta\eta$ is set to a relatively small value, for example, a value from 10% to 50% in each of the plurality of SOC ranges X to be the option of the operation SOC range. In an example, in each SOC range X, the SOC width $\Delta\eta$ is set to any value from 25% to 35%.

In a preferred example, the processing circuit 11 or the like sets the SOC width $\Delta\eta$ to be the same between the plurality of SOC ranges X. In this example, when the SOC ranges X1 to X3 are set as in an example of FIG. 2, the SOC widths $\Delta\eta1$ to $\Delta\eta3$ are identical to each other.

In another preferable example, the processing circuit 11 or the like sets the SOC width $\Delta\eta$ to be larger for a lower SOC range among the plurality of SOC ranges X. In this example, when the SOC ranges X1 to X3 are set as in an example of FIG. 2, the SOC width $\Delta\eta1$ is larger than the SOC width $\Delta\eta3$, and the SOC width $\Delta\eta2$ is larger than the SOC width $\Delta\eta1$.

In a preferred example, a first SOC range Xa and a second SOC range Xb are set as the plurality of SOC ranges X to be the option of the operation SOC range, and a median SOC value $\eta cb$ of the second SOC range Xb is higher than an upper limit SOC value $\eta ua$ of the first SOC range Xa. In another preferable example, the first SOC range Xa and a third SOC range Xc are set as the plurality of SOC ranges X to be the option of the operation Soc range, and a median SOC value $\eta cc$ of the third SOC range Xc is lower than a lower limit SOC value $\eta la$ of the first SOC range Xa. More preferably, both the second SOC range Xb and the third SOC range Xc are set as the plurality of SOC ranges X in addition to the first SOC range Xa.

For example, it is assumed that the SOC ranges X1 to X3 are set as in an example of FIG. 2. In this case, the median SOC value $\eta c3$ of the SOC range X3 is preferably higher than the upper limit SOC value $\eta u1$ of the SOC range X1. The median SOC value $\eta c2$ of the SOC range X2 is preferably lower than the lower limit SOC value $\eta l1$ of the SOC range X1. More preferably, the median SOC value $\eta c3$ is higher than the upper limit SOC value $\eta u1$, and the median SOC value $\eta c2$ is lower than the lower limit SOC value $\eta l1$.

In a preferred example, an upper limit SOC value $\eta umax$ is set to any SOC value from 95% to 100% in the highest SOC range Xmax highest among the plurality of SOC ranges X to be the option of the operation SOC range. In another preferable example, a lower limit SOC value $\eta lmin$ is set to any SOC value from 0% to 5% in the lowest SOC range Xmin lowest among the plurality of SOC ranges X. More preferably, the upper limit SOC value $\eta umax$ in the highest SOC range Xmax is set to any SOC value from 95% to 100%, and the lower limit SOC value $\eta lmin$ in the lowest SOC range Xmin is set to any SOC value from 0% to 5%.

For example, it is assumed that the SOC ranges X1 to X3 are set as in an example of FIG. 2. In this case, the upper limit SOC value $\eta u3$ of the SOC range X3 to be the highest SOC range Xmax is preferably set to any SOC value from 95% to 100%. The lower limit SOC value $\eta l2$ in the SOC range X2 to be the lowest SOC range Xmin is preferably set to any SOC value from 0% to 5%. More preferably, the upper limit SOC value $\eta u3$ is set to any SOC value from 95% to 100%, and the lower limit SOC value $\eta l2$ is set to any SOC value from 0% to 5%.

In the operation of the battery 2, the processing circuit 11 or the like selects (allocates) one of the plurality of SOC ranges X set as described above as the operation SOC range. Then, the processing circuit 11 or the like operate the battery 2 in the SOC range X selected as the operation SOC range. Therefore, the charge and discharge of the battery 2 are controlled in a state where the SOC value of the battery 2 falls within the Soc range X selected as the operation SOC range. In the state where the battery 2 is not charged or discharged, the SOC value of the battery 2 is kept at any SOC value in the SOC range X selected as the operation SOC range.

For example, it is assumed that the SOC ranges X1 to X3 are set as in an example of FIG. 2, and the SOC range X1 is selected as the operation SOC range. In this case, the processing circuit 11 or the like charges the battery 2 in a state where the SOC value of the battery 2 does not exceed the upper limit SOC value $\eta u1$ of the Soc range X1. Then, the processing circuit 11 or the like discharge the battery 2 in a state where the SOC value of the battery 2 does not fall below the lower limit SOC value $\eta l1$ of the SOC range X1. In a state where the battery 2 is not charged or discharged, the processing circuit 11 or the like keeps the SOC value of the battery 2 at any SOC value from the lower limit SOC value $\eta l1$ to the upper limit SOC value $\eta u1$ of the SOC range X1.

In the operation of the battery 2, the processing circuit 11 or the like sequentially switch the SOC range X selected as the operation SOC range between the plurality of SOC ranges X set as an option. As a result, the SOC range X to be the operation SOC range is rotated between the plurality of SOC ranges X. As long as the SOC range X selected as the operation SOC range is sequentially switched, the order of selection as the operation SOC range is not particularly limited. Each of the plurality of SOC ranges X to be the option may be periodically selected as the operation SOC range, or may be aperiodically selected as the operation Soc range.

FIG. 3 illustrates an example of the processing of switching the SOC range X selected as the operation SOC range, the switching process being performed by the processing circuit 11 or the like of the operation device 3 in the embodiment or the like. In FIG. 3, a graph in which the abscissa axis represents a time with the time of starting an operation or the like as a reference and the ordinate axis represents an SOC value is illustrated. In FIG. 3, the SOC range X selected as the operation soc range is indicated by hatching. In an example of FIG. 3, as in an example of FIG. 2, the SOC ranges X1 to X3 are set as an option of the operation Soc range. In an example of FIG. 3, the operation SOC range is switched in the order of the SOC range X1, the SOC range X3, the SOC range X1, the SOC range X2, the SOC range X1, the SOC range X3, . . . .

Here, when the SOC ranges X1 to X3 are set as an option of the operation SOC range, the order of selection as the operation SOC ranges is not limited to the order of an example of FIG. 3. In an example, the operation SOC range is switched in the order of the SOC range X1, the SOC range X2, the SOC range X3, the SOC range X1, the SOC range X2, the SOC range X3, . . . . In another example, the operation SOC range is switched in the order of the SOC range X1, the SOC range X2, the SOC range X3, the SOC range X2, the SOC range X1, the SOC range X2, . . . .

In an example, in the operation of the battery 2, the processing circuit 11 or the like calculates an elapsed period T from the time of starting the operation in the SOC range X selected as the operation Soc range in real time. Then, the processing circuit 11 or the like switches the Soc range X to be the operation SOC range based on the fact that the elapsed period T is a prescribed period Tref or more. Therefore, the processing circuit 11 or the like switches the SOC range X to be the operation Soc range in response to the prescribed period Tref or more having elapsed from the time of starting the operation in the SOC range X selected as the operation SOC range in real time. In an example of FIG. 3, the SOC range X selected as the operation SOC range is switched between the plurality of SOC ranges X1 to X3 every prescribed period Tref. The switching of the SOC range X to be the operation SOC range based on the time information such as the elapsed period T is suitable, for example, when the operation of the battery 2 is constant throughout the year. The prescribed period Tref is set to an appropriate value in accordance with the operation strength of the battery 2. For example, the prescribed period Tref is set to a shorter period (for example, one month or the like) in a case where the input/output is large and charging and discharging are frequently repeated than in a case where the input/output is small and the frequency of charging and discharging is also small. Then, the prescribed period Tref is set to a longer period (for example, 3 months or the like) in a case where the input/output is small and the frequency of charging and discharging is also small than in a case where charging and discharging are frequently repeated with large input and output.

In another example, in the operation of the battery 2, the processing circuit 11 or the like calculates an integrated value P of the amount of electric power input to and output from the battery 2 from the time of starting the operation in the SOC range selected as the operation SOC range in real time. The integrated value P corresponds to the sum of the integrated value of the input electric power (charge electric power) to the battery 2 and the integrated value of the output electric power (discharge electric power) from the battery 2 starting from the time of starting the operation in the selected SOC range. The integrated value P of the amount of electric power is calculated based on a temporal change in the current of the battery 2 and a temporal change in the voltage of the battery 2. In this example, the processing circuit 11 or the like switches the SOC range X to be the operation Soc range based on the fact that the integrated value P of the amount of electric power is the prescribed amount Pref of electric power or more. Therefore, the processing circuit 11 or the like switch the SOC range X to be the operation soc range in response to the integrated value P of the amount of electric powers input to and output from the battery 2 from the time of starting the operation in the SOC range X selected as the operation SOC range in real time being the prescribed amount Pref of electric power or more. The switching of the Soc range X to be the operation soc range based on the integrated value of the amount of electric power is suitable, for example, when the operation of the battery 2 greatly changes every season or every month.

FIG. 4 illustrates an example of processing in the operation of the battery 2 performed by the processing circuit 11 or the like of the operation device 3 in the embodiment and the like. When the processing of an example of FIG. 4 is started, the processing circuit 11 or the like acquire information about a plurality of SOC ranges X to be the option of the operation SOC range (S51). The plurality of SOC ranges X is set in a state of being shifted from each other, and is set in the same manner as any of the above-described examples. Then, the processing circuit 11 or the like selects the SOC range X to be the first operation Soc range from the plurality of SOC ranges X (S52). Then, the processing circuit 11 or the like operate the battery 2 in the selected SOC range X (S53). At this time, for example, the processing circuit 11 or the like controls charging and discharging of the battery 2 in a state where the SOC value of the battery 2 falls within the selected SOC range X.

When the operation of the battery 2 is continued (S54—Yes), the processing circuit 11 or the like calculates an elapsed period T from the time of starting the operation in the SOC range X selected (allocated) as the operation Soc range in real time (S55). Then, the processing circuit 11 or the like determine whether the calculated elapsed period T is the prescribed period Tref or more (S56). When the elapsed period T is shorter than the prescribed period Tref (S56—No), the process returns to S53, and the processing circuit 11 or the like sequentially performs the processing of S53 and subsequent steps. As a result, the processing circuit 11 or the like continue the operation of the battery 2 in the SOC range X selected as the operation SOC range in real time. On the other hand, when the elapsed period T is the prescribed period Tref or more (Yes in S56), the processing circuit 11 or the like switches SOC range X selected as the operation SOC range (S57). Then, the process returns to S53, and the processing circuit 11 or the like operates the battery 2 in the SOC range X newly selected as the operation soc range.

In an example, instead of the processing of S55 and S56, the processing circuit 11 or the like calculates the integrated value P of the amount of electric power input to and output from the battery 2 from the time of starting the operation in the SOC range selected as the operation Soc range in real time. Then, the processing circuit 11 or the like determines whether the calculated integrated value P of the amount of electric power is the prescribed amount Pref of electric power or more. When the integrated value P of the amount of electric power is smaller than the prescribed amount Pref of electric power, the processing circuit 11 or the like continues the operation of the battery 2 in the SOC range X selected as the operation SOC range in real time. On the other hand, when the integrated value P of the amount of electric power is the prescribed amount Pref of electric power or more, the processing circuit 11 or the like switches the SOC range X selected as the operation soc range. Then, the processing circuit 11 or the like operate the battery 2 in the SOC range X newly selected as the operation Soc range.

Here, in the case of charging and discharging the battery 2 in an SOC range whose SOC width is relatively small, such as a range whose SOC width is 50% or less, when the battery is repeatedly charged and discharged only in one specific SOC range, the progress of deterioration of the battery 2 may be accelerated depending on the type of the electrode active material used for the battery 2. For example, in the battery 2 in which lithium iron phosphate (LFP) is used as the positive electrode active material, the progress of the deterioration of the battery 2 tends to be accelerated by charging and discharging the battery 2 only in one SOC range whose SOC width is relatively small.

In the present embodiment, one of the plurality of SOC ranges X shifted from each other is selected as the operation Soc range, and the battery 2 is operated in the SOC range X selected as the operation SOC range. The SOC range X selected as the operation SOC range is sequentially switched between the plurality of SOC ranges X. For this reason, even in the usage mode in which the battery 2 is charged and discharged in the SOC range whose SOC width is relatively small, such as the range whose SOC width is 50% or less, the battery 2 is not continuously operated only in one specific SOC range X, and the SOC range X is sequentially switched to charge and discharge the battery 2. That is, by sequentially switching the operation SOC range between the plurality of Soc ranges X, it is possible to effectively prevent the battery 2 from being operated only in a specific soc range. As a result, even in the usage mode in which the battery 2 is charged and discharged in the SOC range whose SOC width is relatively small, the progress of the deterioration of the battery 2 is appropriately reduced.

Further, in the present embodiment, since the progress of the deterioration of the battery 2 is reduced by sequentially switching the SOC range X to be the operation SOC range, it is not necessary to perform the recovery process of the battery 2 by interrupting the operation of the battery 2 or the like. For example, in a usage mode in which the battery 2 is charged and discharged in the SOC range whose SOC width is relatively small, it is not necessary to perform the recovery process of the battery 2 by repeating the charge-and-discharge cycle between the SOC value 0% and the SOC value 100%. Since the operation of the battery 2 is not interrupted by the recovery process or the like, the battery 2 is appropriately operated.

In the present embodiment, the plurality of SOC ranges X are set so as to be in a state in which between the plurality of SOC ranges X, the median SOC values $\eta c$ are different, the upper limit SOC values $\eta u$ are different, and the lower limit SOC values $\eta l$ are different. Therefore, the plurality of SOC ranges X shifted from each other is appropriately set as an option of the operation SOC range.

In an example of the present exemplary embodiment, in addition to the first SOC range Xa, at least one of the second SOC range Xb in which the median SOC value $\eta cb$ is higher than the upper limit SOC value $\eta ua$ of the first SOC range Xa and the third SOC range Xc in which the median SOC value $\eta cc$ is lower than the lower limit SOC value $\eta la$ of the first SOC range Xa is set as the plurality of SOC ranges X. When the SOC range X is set as described above, the battery 2 is operated in a wide SOC range by sequentially switching the operation SOC range between the plurality of SOC ranges X. As a result, the progress of deterioration of the battery 2 is further appropriately reduced.

In a more preferred example, both the second SOC range Xb and the third SOC range Xc are set as the plurality of SOC ranges X in addition to the first soc range Xa. When the SOC range X is set as described above, the battery 2 is operated in a wider SOC range by sequentially switching the operation SOC range between the plurality of SOC ranges X. As a result, the progress of deterioration of the battery 2 is further appropriately reduced.

In an example of the present exemplary embodiment, the upper limit SOC value $\eta umax$ of the highest SOC range Xmax highest among the plurality of SOC ranges X is set to any SOC value from 95% to 100%. In this case, by sequentially switching the operation SOC range between the plurality of SOC ranges X, the battery 2 is operated even in a range where the SOC value is 95% or more, and the battery 2 is operated in a wider SOC range. As a result, the progress of deterioration of the battery 2 is further appropriately reduced.

Further, in an example of the present embodiment, the lower limit SOC value $\eta lmin$ in the lowest SOC range Xmin lowest among the plurality of SOC ranges X is set to any SOC value from 0% to 5%. In this case, by sequentially switching the operation Soc range between the plurality of SOC ranges X, the battery 2 is operated even in a range where the SOC value is 5% or less, and the battery 2 is operated in a wider SOC range. As a result, the progress of deterioration of the battery 2 is further appropriately reduced.

In a more preferred example, the upper limit SOC value $\eta umax$ in the highest SOC range Xmax is set to any SOC value from 95% to 100%, and the lower limit SOC value $\eta lmin$ in the lowest SOC range Xmin is set to any SOC value from 0% to 5%. In this case, by sequentially switching the operation Soc range between the plurality of SOC ranges X, the battery 2 is operated in both the range where the SOC value is 95% or more and the range where the SOC value is 5% or less, and the battery 2 is operated in a wider SOC range. As a result, the progress of deterioration of the battery 2 is further appropriately reduced.

Further, in an example of the present embodiment, the SOC width $\Delta \eta$ from the upper limit Soc value nu to the lower limit SOC value $\eta l$ is the same between the plurality of SOC ranges X. When the battery 2 is operated by sequentially switching the operation soc range between the plurality of SOC ranges X, the progress of the degradation of the battery 2 is further appropriately reduced by making the SOC widths $\Delta \eta$ equal to each other in the plurality of SOC ranges X.

In an example of the present embodiment, the SOC width $\Delta \eta$ from the upper limit SOC value $\eta u$ to the lower limit SOC value $\eta l$ increases in the lower SOC range in the plurality of SOC ranges X. In the battery 2, the voltage decreases as the SOC value decreases. Therefore, by increasing the SOC width $\Delta \eta$ in the lower SOC range, the variation in the amount of electric power between the plurality of SOC ranges X in the case of charging the battery from the lower limit SOC value $\eta l$ to the upper limit SOC value $\eta u$ with the current of the same magnitude is reduced. Similarly, by increasing the SOC width $\Delta \eta$ in a lower SOC range, the variation in the amount of electric power between the plurality of SOC ranges X in the case of discharging the battery with the current of the same magnitude from the upper limit SOC value $\eta u$ to the lower limit SOC value $\eta l$ is reduced.

Further, in an example of the present embodiment, the SOC range X to be the operation Soc range is switched in response to the prescribed period Tref or more having elapsed from the time of starting the operation in the SOC range X selected as the operation SOC range. As a result, the length of the operation period from the start to the end of the operation in the selected SOC range X is made uniform between the plurality of operation periods. Therefore, the SOC range X selected as the operation SOC range is periodically switched.

In an example of the present embodiment, the SOC range X to be the operation SOC range is switched in response to the integrated value P of the amount of electric power input to and output from the battery 2 from the time of starting the operation in the SOC range X selected as the operation SOC range being the prescribed amount Pref of electric power or more. As a result, the variation in the amount of electric power input to and output from the battery 2 between the plurality of operation periods during the operation period from the start to the end of the operation in the selected SOC range X is suppressed.

FIG. 5 illustrates an example of an operation system 1 according to a modification. As shown in FIG. 5, in the present modification, the battery 2 is mounted on vehicle 10. Examples of the vehicle 10 include a railway vehicle, an electric bus, an electric automobile, a plug-in hybrid automobile, and an electric motorcycle. Also in the present modification, as in the above-described implementation and the like, the operation system 1 includes the operation device 3, the current measurement circuit 5, the voltage measurement circuit 6, and the drive circuit 7, and the operation device 3 includes the processing circuit 11 and the storage medium 12. The storage medium 12 stores a data management program 15, an operation program 16, and the like as programs to be executed by the processing circuit 11. In an example of FIG. 5, the operation device 3 is a computer or the like mounted on the vehicle 10. However, the operation device 3 may be a computer or the like outside the vehicle 10, or may be a cloud server in a cloud environment.

In the present modification, the battery 2 is electrically connected to a drive mechanism 21 of the vehicle 10 via the drive circuit 7. The processing circuit 11 controls supply of electric power from the battery 2 to the drive mechanism 21 by controlling driving of the drive circuit 7. The drive mechanism 21 includes a traveling drive unit (not illustrated), and the traveling drive unit includes an electric motor for traveling and the like. The traveling drive unit is driven by the electric power supplied from the battery 2 to the drive mechanism 21, whereby the vehicle 10 performs the traveling operation.

In the present modification, the battery 2 can be electrically connected to a load 22, electric power sources 23, 25, and the like outside the vehicle 10 via the drive circuit 7. In a state where the battery 2 is electrically connected to the load 22, the processing circuit 11 controls supply of electric power from the battery 2 to the load 22 by controlling driving of the drive circuit 7. In addition, in a state where the battery 2 is electrically connected to each of the electric power sources 23 and 25, the processing circuit 11 controls supply of electric power from each of the electric power sources 23 and 25 to the battery 2 by controlling driving of the drive circuit 7.

Here, examples of the load 22 include household electrical equipment, an electric device capable of supplying electric power from the battery 2 via a power grid, and the like. Examples of the electric power source 23 include an electric power source mounted on a charger of an electric automobile, and examples of the electric power source 25 include an electric power source used at home and an electric power source capable of exchanging electric power with the battery 2 via a power grid. Since the battery 2 is used as described above, in the present modification, the battery 2 is used as an electric power source for driving the vehicle 10, and is also used as a stationary electric power source of a vehicle to home (V2H) or a vehicle to grid (V2G).

Also in the present modification, as in the above-described embodiment, a plurality of SOC ranges X shifted from each other is set as an option of the operation SOC range of the battery 2. The processing circuit 11 or the like selects one of the plurality of SOC ranges X as the operation SOC range, and operates the battery 2 in the selected SOC range X as the operation SOC range. In the present modification, a vehicle soc range Xp and a non-vehicle SOC range Xq are set as the plurality of SOC ranges X shifted from each other.

FIG. 6 illustrates an example of the vehicle SOC range Xp and the non-vehicle SOC range Xq set by the processing circuit 11 or the like of the operation device 3 in the present modification. In FIG. 6, the abscissa axis represents either the vehicle SOC range Xp or the non-vehicle SOC range Xq, and the ordinate axis represents the SOC value. As shown in FIG. 6, in the present modification, a median Soc value $\eta cp$ of the vehicle SOC range Xp is higher than a median SOC value $\eta cq$ of the non-vehicle SOC range Xq, and an upper limit SOC value $\eta up$ of the vehicle SOC range Xp is higher than an upper limit SOC value $\eta uq$ of the non-vehicle Soc range Xq. A lower limit SOC value $\eta lp$ of the vehicle Soc range Xp is higher than a lower limit SOC value $\eta lq$ of the non-vehicle SOC range Xq. Therefore, in setting the vehicle SOC range Xp and the non-vehicle SOC range Xq, the processing circuit 11 or the like sets each of the median SOC value $\eta c$, the upper limit SOC value $\eta u$, and the lower limit SOC value $\eta l$ higher in the vehicle SOC range Xp than in the non-vehicle SOC range Xq.

In the present modification, as in an example of FIG. 6, the lower limit SOC value $\eta lp$ of the vehicle SOC range Xp is preferably set to the upper limit SOC value $\eta uq$ or more in the non-vehicle SOC range Xq. By setting vehicle SOC range Xp and non-vehicle SOC range Xq in this manner, the vehicle SOC range Xp does not overlap any part of the non-vehicle SOC range Xq. In an example of FIG. 6, the lower limit SOC value $\eta lp$ of the vehicle SOC range Xp is equal to the upper limit SOC value $\eta uq$ of the non-vehicle SOC range Xq. In an example, the SOC range from 40% to 90% is set as the vehicle SOC range Xp, and the SOC range from 0% to 40% is set as the non-vehicle SOC range Xq. In another example, the SOC range from 40% to 100% is set as the vehicle SOC range Xp, and the SOC range from 0% to 40% is set as the non-vehicle SOC range Xq. In an example of FIG. 6, the lower limit SOC value $\eta lq$ of the non-vehicle SOC range Xq is 0%.

In the present modification, the lower limit SOC value $\eta lp$ of the vehicle SOC range Xp may be set lower than the upper limit Soc value $\eta uq$ of the non-vehicle SOC range Xq. Also in this case, each of the median SOC value $\eta c$, the upper limit SOC value $\eta u$, and the lower limit SOC value $\eta l$ is set higher in the vehicle SOC range Xp than in the non-vehicle SOC range Xq. When the lower limit SOC value $\eta lp$ of the vehicle SOC range Xp is lower than the upper limit SOC value $\eta uq$ of the non-vehicle SOC range Xq, the lower limit SOC value $\eta lp$ of the vehicle Soc range Xp is preferably higher than the median SOC value $\eta cq$ of the non-vehicle SOC range Xq. In an example, the SOC range from 35% to 100% is set as the vehicle SOC range Xp, and the SOC range from 0% to 40% is set as the non-vehicle SOC range Xq.

In the present modification, the processing circuit 11 monitors the operation state of the vehicle 10. Then, the processing circuit 11 determines whether the condition for permitting electric power supply from the battery 2 to the outside of the vehicle 10 is satisfied based on the operation state of the vehicle 10 and the like. In an example, the processing circuit 11 determines that the condition for permitting electric power supply to the outside of the vehicle 10 is satisfied in response to the traveling operation of the vehicle 10 being continuously stopped for a specified time or more. In another example, the processing circuit 11 determines that the condition for permitting electric power supply to the outside of the vehicle 10 is satisfied in response to driving of all the drive units including the travel drive unit in the drive mechanism 21 being continuously stopped for a specified time or more. In a state where all the drive units of the drive mechanism 21 are stopped, the traveling operation of the vehicle 10 is stopped, and the operations of the air conditioner, the audio device, and the like mounted on the vehicle 10 are also stopped. Note that the condition determined by the processing circuit 11 as to whether the condition is satisfied, that is, the condition for permitting electric power supply to the outside of the vehicle 10 may be settable by the user or the like via the user interface. In this case, a program for forming an environment in which the above-described conditions can be set by the user or the like is stored in the storage medium 12, or a processing circuit or the like for performing the process for forming an environment in which the above-described conditions can be set by the user or the like is separately provided in the operation system 1.

In the present modification, when the condition for permitting electric power supply from the battery 2 to the outside of the vehicle 10 is not satisfied, the processing circuit 11 selects the vehicle SOC range Xp as the operation SOC range, and operates the battery 2 in the vehicle SOC range Xp. Therefore, electric power is supplied from the battery 2 to the drive mechanism 21 of the vehicle 10 in a state where the SOC value of the battery 2 falls within the vehicle SOC range Xp selected as the operation SOC range. Therefore, the vehicle 10 performs an operation such as a traveling operation in a state where the SOC value of the battery 2 falls within the vehicle SOC range Xp. When the condition for permitting electric power supply to the outside of the vehicle 10 is not satisfied, the battery 2 is charged with electric power input from the charger (electric power source 23) in a state where the SOC value of the battery 2 falls within the vehicle SOC range Xp selected as the operation SOC range.

When the condition for permitting electric power supply from the battery 2 to the outside of the vehicle 10 is satisfied, the processing circuit 11 selects the non-vehicle SOC range Xq as the operation SOC range, and operates the battery 2 in the non-vehicle SOC range Xq. Therefore, the electric power discharged from the battery 2 is supplied to load 22 outside the vehicle 10 in a state where the SOC value of battery 2 falls within non-vehicle SOC range Xq selected as the operation SOC range. When the condition for permitting electric power supply to the outside of the vehicle 10 is satisfied, the battery 2 is charged with electric power input from the electric power source 25 outside the vehicle 10 in a state where the SOC value of the battery 2 falls within the non-vehicle SOC range Xq selected as the operation SOC range.

As described above, in the present modification, the processing circuit 11 or the like switches the SOC range X selected as the operation soc range between the vehicle SOC range Xp and the non-vehicle SOC range Xq set as options in accordance with the operation state of the vehicle 10 or the like. Therefore, also in the present modification, as in the above-described embodiment and the like, the SOC range X selected as the operation SOC range of the battery 2 is sequentially switched between the plurality of SOC ranges X.

FIG. 7 illustrates an example of processing in the operation of the battery 2 performed by the processing circuit 11 or the like of the operation device 3 in the present modification. When the processing of an example of FIG. 7 is started, the processing circuit 11 or the like acquire information about a plurality of SOC ranges X to be the option of the operation Soc range (S61). In the present modification, the processing circuit 11 or the like acquires information about the vehicle SOC range Xp and the non-vehicle SOC range Xq set as the plurality of SOC ranges X. Then, the processing circuit 11 or the like acquire information about the operation state of the vehicle 10 (S62). Then, the processing circuit 11 or the like determine whether the condition for permitting electric power supply from the battery 2 to the outside of the vehicle 10 is satisfied (S63). At this time, as in any of the above-described examples, it is determined whether the condition for permitting electric power supply to the outside of the vehicle 10 is satisfied.

When the condition for permitting electric power supply to the outside of the vehicle 10 is not satisfied (No in S63), the processing circuit 11 or the like selects the vehicle SOC range Xp as the operation SOC range, and operates the battery in the vehicle SOC range Xp (S64). At this time, for example, the processing circuit 11 or the like supplies electric power from the battery 2 to the drive mechanism 21 of the vehicle 10 in a state where the SOC value of the battery 2 falls within the vehicle SOC range Xp. Then, when the operation of the battery 2 is continued (S65—Yes), the process returns to S62, and the processing circuit 11 or the like sequentially performs the processing of S62 and subsequent steps.

On the other hand, when the condition for permitting electric power supply to the outside of the vehicle 10 is satisfied (Yes in S63), the processing circuit 11 or the like selects the non-vehicle Soc range Xq as the operation SOC range, and operates the battery in the non-vehicle SOC range Xq (S66). At this time, for example, the processing circuit 11 or the like supplies electric power from the battery 2 to the load 22 outside the vehicle 10 in a state where the SOC value of the battery 2 falls within the non-vehicle SOC range Xq. The processing circuit 11 or the like input electric power from the electric power source 25 outside the vehicle 10 to the battery 2 in a state where the SOC value of the battery 2 falls within the non-vehicle SOC range Xq. Then, when the operation of the battery 2 is continued (S67—Yes), the process returns to S62, and the processing circuit 11 or the like sequentially performs the processing of S62 and subsequent steps.

By performing the processing of an example of FIG. 7, it is determined whether the condition for permitting electric power supply to the outside of the vehicle 10 is satisfied in accordance with the operation state of the vehicle 10 as long as the operation of the battery 2 is continued. Based on the determination result as to whether the condition for permitting the electric power supply to the outside of the vehicle 10 is satisfied, the corresponding one of the vehicle SOC range Xp and the non-vehicle SOC range Xq is selected as the operation SOC range of the battery 2, and the battery 2 is operated in the selected SOC range.

Also in the present modification, as in the above-described embodiment and the like, one of the plurality of SOC ranges X shifted from each other is selected as the operation SOC range, and the battery 2 is operated in the SOC range X selected as the operation soc range. The SOC range X selected as the operation soc range is sequentially switched between the plurality of SOC ranges X. Therefore, the present modification also achieves the same operations and effects as those of the above-described embodiment and the like. That is, also in the present modification, by sequentially switching the operation SOC range between the plurality of SOC ranges X, it is possible to effectively prevent the battery 2 from being operated only in a specific SOC range. As a result, even in the usage mode in which the battery 2 is charged and discharged in the SOC range whose SOC width is relatively small, the progress of the deterioration of the battery 2 is appropriately reduced.

In the present modification, each of the median SOC value $\eta c$, the upper limit SOC value $\eta u$, and the lower limit SOC value $\eta l$ is set higher in the vehicle SOC range Xp than in the non-vehicle SOC range Xq. As a result, in a state where the battery 2 is operated with the vehicle SOC range Xp as the operation SOC range, the battery 2 is operated in a region where the SOC value is relatively high. For this reason, in a state in which the vehicle 10 is operated by the electric power supplied from the battery 2 to the drive mechanism 21, shortage of the electric power supplied to the drive mechanism 21 and the like are effectively prevented, and occurrence of an electric-deficiency state is effectively prevented.

In a preferred example of the present modification, the lower limit SOC value $\eta lp$ of the vehicle SOC range Xp is set to the upper limit SOC value $\eta uq$ or more in the non-vehicle SOC range Xq. By setting the vehicle SOC range Xp and the non-vehicle SOC range Xq in this manner, in a state where the battery 2 is operated with the non-vehicle SOC range Xq as the operation SOC range, the battery 2 is operated in a region where the SOC value is relatively low, unlike at the time of operation of the vehicle 10. Therefore, the battery 2 is operated in a wide SOC range by sequentially switching the operation SOC range between the vehicle soc range Xp and the non-vehicle SOC range Xq. As a result, the progress of deterioration of the battery 2 is further appropriately reduced.

In an example of the present modification, the processing circuit 11 or the like calculates a ratio $\xi$ of the operation time in the non-vehicle SOC range Xq to the operation time in the vehicle SOC range Xp. Then, in a case where the ratio $\xi$ is larger than 1, the processing circuit 11 or the like performs processing of bringing the ratio $\xi$ close to 1. In this example, the processing circuit 11 or the like operate the battery 2 not in the non-vehicle SOC range Xq but in the vehicle SOC range Xp in part or all of the operation time for supplying electric power to the outside of the vehicle 10, for example as processing for bringing the ratio $\xi$ close to 1. In addition, the processing circuit 11 or the like may operate the battery 2 not in the non-vehicle SOC range Xq but in an SOC range Xr including the vehicle SOC range Xp in part or all of the operation time for supplying electric power to the outside of the vehicle 10 as processing for bringing the ratio $\xi$ close to 1. In this case, the SOC range Xr is wider than the vehicle Soc range Xp. An upper limit SOC value $\eta ur$ of the SOC range Xr is the upper limit SOC value $\eta up$ or more of the vehicle SOC range Xp, and a lower limit SOC value $\eta lr$ of SOC range Xr is the lower limit SOC value $\eta lp$ or less of the vehicle SOC range Xp.

Furthermore, in an example of the present modification, the processing circuit 11 or the like performs processing of bringing the ratio $\xi$ close to 1 in a case where the above-described ratio $\xi$ is smaller than 1. In this example, the processing circuit 11 or the like operate the battery 2 not in the vehicle SOC range Xp but in the non-vehicle SOC range Xq, for example, in part or all of the operation time for supplying electric power to the drive mechanism 21 of the vehicle 10 as the processing for bringing the ratio ξ close to 1. In addition, the processing circuit 11 or the like may operate the battery 2 not in the vehicle SOC range Xp but in an SOC range Xs including the non-vehicle Soc range Xq in part or all of the operation time for supplying electric power to the drive mechanism 21 of the vehicle 10 as the processing for bringing the ratio ξ close to 1. In this case, the SOC range Xs is wider than the non-vehicle SOC range Xq. An upper limit SOC value ηus of the SOC range Xs is the upper limit SOC value ηuq or more of the non-vehicle SOC range Xq, and a lower limit SOC value ηls of the SOC range Xs is the lower limit SOC value ηlq or less of the non-vehicle SOC range Xq.

As a specific example, in a case where the above-described ratio ξ is larger than 1, the processing circuit 11 or the like operates the battery 2 in the non-vehicle SOC range Xq in the operation of supplying electric power to the outside of the vehicle 10 from Monday to Friday. However, when the ratio ξ is larger than 1, the processing circuit 11 or the like operates the battery 2 in the SOC range Xr including the vehicle SOC range Xp in the operation of supplying electric power to the outside of the vehicle 10 on Saturday and Sunday. As a result, the ratio ξ approaches 1. In an example, the SOC range from 40% to 90% is set as the vehicle SOC range Xp, and the SOC range from 0% and 100% is set as the SOC range Xr.

Furthermore, in a specific example, in a case where the above-described ratio ξ is smaller than 1, the processing circuit 11 or the like operate the battery 2 in the vehicle Soc range Xp in the operation of supplying electric power to the drive mechanism 21 of the vehicle 10 on Saturday and Sunday. However, when the ratio ξ is smaller than 1, the processing circuit 11 or the like operates the battery 2 in the SOC range Xs including the non-vehicle SOC range Xq in the operation of supplying electric power to the drive mechanism 21 of the vehicle 10 from Monday to Friday. As a result, the ratio ξ approaches 1. In an example, the SOC range from 0% to 40% is set as the non-vehicle SOC range Xq, and the SOC range from 0% to 100% is set as the SOC range Xs.

In addition, the following first verification and second verification were performed as verification related to the above-described embodiment and the like. In the first verification, the batteries were operated in three patterns of Comparative Example 1, Example 1, and Example 2. As the battery, a cylindrical battery cell having a diameter of 26 mm and a height of 650 mm was used. That is, a 26650 type cylindrical battery cell was used as a battery. As an electrode active material of a battery, lithium iron phosphate (LFP) was used as a positive electrode active material, and graphite that is a kind of carbonaceous material was used as a negative electrode active material.

In the battery used, the battery capacity in the initial state at the start of use was 2500 mAh. In the battery, the end-of-charge voltage was 3.6 V, and 3.6 V was set as a voltage corresponding a state where the SOC value was 100%. In the battery, the end-of-discharge voltage was 2.0 V, and 2.0 V was set as a voltage corresponding to a state where the SOC value was 0%. The first verification was performed at an environmental temperature of 25° C. In the first verification, the real time SOC value of the battery was calculated as described above in the embodiment and the like.

In Comparative Example 1, only the charge-and-discharge cycle between the SOC value 35% and the SOC value 65% where the SOC width was 30% was repeated. In one cycle, the battery was charged at a charge rate of 2 C from an SOC value 35% to an SOC value 65%, and the battery was discharged at a discharge rate of 2 C from an SOC value 65% to an SOC value 35%. In Comparative Example 1, the battery was discharged to an SOC value of 0% at a discharge rate of 0.3 C every 50 cycles. Then, the battery was charged from an SOC value of 0% to an SOC value of 35% at a charge rate of 0.3 C, and then the next cycle was started.

In Example 1, an SOC range Xa between the lower limit SOC value 10% and the upper limit SOC value 40% where the SOC width is 30%, an SOC range XB between the lower limit SOC value 22.5% and the upper limit SOC value 52.5% where the SOC width is 30%, an SOC range Xγ between the lower limit SOC value 47.5% and the upper limit SOC value 77.5% where the SOC width is 30%, and an SOC range Xε between the lower limit SOC value 60% and the upper limit SOC value 90% where the SOC width is 30% were set. Then, one of the SOC ranges Xα, Xβ, Xγ, and Xε was selected as the operation SOC range, and the battery was operated.

In the operation of the battery, a charge-and-discharge cycle between the lower limit SOC value and the upper limit SOC value in the SOC range selected as the operation SOC range was performed. In one cycle, the battery was charged at a charge rate of 2 C from the lower limit SOC value to the upper limit SOC value, and the battery was discharged at a discharge rate of 2 C from the upper limit SOC value to the lower limit SOC value.

In Example 1, the SOC range selected as the operation Soc range is switched between the SOC ranges Xα, Xβ, Xγ, and Xε every 50 cycles. Then, the operation SOC range was switched every 50 cycles in the order of Xα →Xβ→Xγ→Xε→Xγ→Xβ→Xα, and the operation SOC range was repeatedly switched every 50 cycles in the above-described order. In Example 1, the battery was discharged to an SOC value of 0% at a discharge rate of 0.3 C every 50 cycles. Then, the battery was charged from an SOC value of 0% to a lower limit SOC value of the next cycle at a charge rate of 0.3 C, and then the next cycle was started.

Also in Example 2, four SOC ranges Xα, Xβ, Xγ, and Xε were set as in Example 1. Then, one of the SOC ranges Xα, Xβ, Xγ, and Xε was selected as the operation SOC range, and the battery was operated. Also in Example 2, in the operation of the battery, the charge-and-discharge cycle was performed between the lower limit SOC value and the upper limit SOC value in the SOC range selected as the operation SOC range. In one cycle, the battery was charged at a charge rate of 2 C from the lower limit SOC value to the upper limit SOC value, and the battery was discharged at a discharge rate of 2 C from the upper limit SOC value to the lower limit SOC value.

In Example 2, unlike Example 1, the SOC range to be selected as the operation SOC range is switched between the SOC ranges Xα, Xβ, Xγ, and Xε every 25 cycles. Then, the operation SOC range was switched every 25 cycles in the order of Xα→Xβ→Xγ→Xε→Xγ→Xβ→Xα, and the operation SOC range was repeatedly switched every 25 cycles in the above-described order. In Example 2, the battery was discharged to an SOC value of 0% at a discharge rate of 0.3 C every 25 cycles. Then, the battery was charged from an SOC value of 0% to a lower limit SOC value of the next cycle at a charge rate of 0.3 C, and then the next cycle was started.

In each of Comparative Example, Example 1, and Example 2, the battery capacity of the battery was measured at each of a plurality of time points while operating the battery as described above. Then, at each time point when the battery capacity was measured, the capacity retention ratio of the battery capacity with respect to the battery capacity (2500 mAh) in the initial state was calculated, and the temporal change in the capacity retention ratio of the battery capacity was calculated. In the measurement of the battery capacity of the battery, the battery was charged up to an SOC value of 100% at a charge rate of 0.1 C. Then, the battery was discharged at a discharge rate of 0.1 C from the SOC value 100% to the SOC value 0%, and a discharge capacity from the SOC value 100% to the SOC value 0% was measured as a battery capacity of the battery.

In each of Comparative Example, Example 1, and Example 2, the cumulative value of the amount of discharge of the battery from the time of starting the operation of the battery (the time of starting the first cycle) was calculated at each time point when the battery capacity was measured. Then, at each time point when the battery capacity was measured, an equivalent cycle value was calculated as a value obtained by dividing the cumulative value of the amount of discharge of the battery by the battery capacity (2500 mAh) in the initial state. The equivalent cycle value corresponds to a value indicating how many cycles (how many times) the charge-and-discharge cycle is performed between the SOC value 0% and the SOC value 100% where the SOC width is 100%.

FIG. 8 illustrates a temporal change in the capacity retention ratio of the battery capacity in each of Comparative Example 1, Example 1, and Example 2 as a verification result in the first verification. In FIG. 8, the abscissa axis represents the equivalent cycle value described above, and the ordinate axis represents the capacity retention ratio of the battery capacity. In FIG. 8, the change in the capacity retention ratio in Example 1 is plotted by the solid line and circles, the change in the capacity retention ratio in Example 2 is plotted by the broken line and triangles, and the change in the capacity retention ratio in Comparative Example 1 is plotted by the alternate long and short dash line and squares.

As shown in FIG. 8 and the like, in each of Example 1 and Example 2, even when the equivalent cycle value was 2000 or more, the capacity retention ratio of the battery capacity was maintained at 95% or more. On the other hand, in Comparative Example 1, when the equivalent cycle value was about 1000, the capacity retention ratio of the battery capacity fell below 85%. When the equivalent cycle value reached about 1500, the capacity retention ratio of the battery capacity fell below 80%.

From the above-described the first verification, it has been demonstrated that in a battery in which lithium iron phosphate is used as a positive electrode active material, the progress of deterioration of the battery is accelerated when charging and discharging are continued only in one SOC range whose SOC width is relatively small. In addition, it has been demonstrated that even when the SOC width of each of the plurality of SOC ranges is relatively small, the progress of deterioration of the battery is appropriately reduced by sequentially switching the SOC range selected as the operation SOC range between the plurality of SOC ranges shifted from each other.

Also in the second verification, a 26650 type cylindrical battery cell similar to that in the first verification was used as a battery. Also in the second verification, lithium iron phosphate (LFP) was used as the positive electrode active material and graphite was used as the negative electrode active material in the battery. Also in the second verification, the battery capacity in the initial state was 2500 mAh in the battery used. In the battery used, 3.6 V as the end-of-charge voltage was set to a voltage corresponding to a state where the SOC value was 100%, and 2.0 V as the end-of-discharge voltage was set to a voltage corresponding to a state where the SOC value was 0%. The second verification was also performed at an environmental temperature of 25° C.

In the second verification, the batteries were operated in three patterns of Comparative Example 2, Example 3, and Example 4. In Comparative Example 2, only the charge-and-discharge cycle between the SOC value of 35% and the SOC value of 100% was repeated. In one cycle, the battery was charged at a charge rate of 2 C from an SOC value 35% to an SOC value 100%, and the battery was discharged at a discharge rate of 2 C from an SOC value 100% to an SOC value 35%. In Comparative Example 2, the battery capacity of the battery was measured every 150 cycles. At this time, the battery was charged up to an SOC value of 100% at a charge rate of 0.1 C. Then, the battery was discharged at a discharge rate of 0.1 C from the SOC value 100% to the SOC value 0%, and a discharge capacity from the SOC value 100% to the SOC value 0% was measured as a battery capacity of the battery.

In Example 3, an SOC range Xμ between the lower limit SOC value 35% and the upper limit SOC value 100% and an SOC range Xυ between the lower limit SOC value 0% and the upper limit SOC value 40% were set. Then, one of the SOC ranges Xμ and Xυ was selected as the operation SOC range, and the battery was operated. In Example 3, a battery charge-and-discharge process Ya was repeatedly performed. In one time charge-and-discharge process Ya, after 25 cycles of charge-and-discharge cycles in the SOC range Xμ were performed, 8 cycles of charge-and-discharge cycles in the SOC range Xυ were performed. In one cycle of the charge-and-discharge cycle in the SOC range Xμ, the battery was charged at a charge rate of 2 C from the lower limit SOC value 35% to the upper limit SOC value 100%, and the battery was discharged at a discharge rate of 2 C from the upper limit SOC value 100% to the lower limit SOC value 35%. In one cycle of the charge-and-discharge cycle in the SOC range Xυ, the battery was charged at a charge rate of 2 C from the lower limit SOC value 0% to the upper limit SOC value 40%, and the battery was discharged at a discharge rate of 2 C from the upper limit SOC value 40% to the lower limit SOC value 0%.

In a state where the charge-and-discharge process Ya of the battery was repeatedly performed, in switching from the charge-and-discharge cycle in the SOC range Xu to the charge-and-discharge cycle in the SOC range Xυ, the battery was discharged from the SOC value 35% to the SOC value 0%, and then the charge-and-discharge cycle in the SOC range Xυ was started. In the switching from the charge-and-discharge cycle in the SOC range Xυ to the charge-and-discharge cycle in the SOC range Xμ, the battery was charged from the SOC value 0% to the SOC value 35%, and then the charge-and-discharge cycle in the SOC range Xμ was started. In Example 3, the battery capacity of the battery was measured every time the above-described charge-and-discharge process Ya was repeated six times. At this time, the battery was charged up to an SOC value of 100% at a charge rate of 0.1 C. Then, the battery was discharged at a discharge rate of 0.1 C from the SOC value 100% to the SOC value 0%, and a discharge capacity from the SOC value 100% to the SOC value 0% was measured as a battery capacity of the battery.

Also in Example 4, two SOC ranges Xu and Xv were set as in Example 3. Then, one of the SOC ranges Xu and Xυ was selected as the operation SOC range, and the battery was operated. In Example 4, instead of the charge-and-discharge process Ya, a charge-and-discharge process Yb of the battery was repeatedly performed. In one time charge-and-discharge process Yb, after 25 cycles of charge-and-discharge cycles in the SOC range Xμ were performed, 4 cycles of charge-and-discharge cycles in the SOC range Xυ were performed. In each of one cycle of a charge-and-discharge cycle in the SOC range Xμ and one cycle of a charge-and-discharge cycle in the SOC range Xυ, the battery was charged and discharged in the same manner as in Example 3. By performing the charge-and-discharge process Yb described above, the ratio of the number of cycles of the charge-and-discharge cycles in the SOC range Xυ to the number of cycles of the charge-and-discharge cycles in the SOC range Xμ was lower in Example 4 than that in Example 3. The ratio was closer to 1 in Example 3 than in Example 4.

In a state where the battery charge-and-discharge process Yb was repeatedly performed, in switching from the charge-and-discharge cycle in the SOC range Xμ to the charge-and-discharge cycle in the SOC range Xυ, the battery was discharged from the SOC value 35% to the SOC value 0%, and then the charge-and-discharge cycle in the SOC range Xυ was started. In switching from the charge-and-discharge cycle in the SOC range Xυ to the charge-and-discharge cycle in the SOC range Xμ, the battery was charged from the SOC value 0% to the SOC value 35%, and then the charge-and-discharge cycle in the SOC range Xμ was started. In Example 4, the battery capacity of the battery was measured every time the above-described charge-and-discharge process Yb was repeated six times. At this time, the battery was charged up to an SOC value of 100% at a charge rate of 0.1 C. Then, the battery was discharged at a discharge rate of 0.1 C from the SOC value 100% to the SOC value 0%, and a discharge capacity from the SOC value 100% to the SOC value 0% was measured as a battery capacity of the battery.

In the second verification, the temporal change in the capacity retention ratio of the battery capacity was calculated for each of Comparative Example 2, Example 3, and Example 4. At this time, as in the first verification, the temporal change in the capacity retention ratio of the battery capacity was calculated by calculating the capacity retention ratio of the measured battery capacity to the battery capacity (2500 mAh) in the initial state at each of the plurality of time points when the battery capacity was measured. In each of Comparative Example 2, Example 3, and Example 4 of the second verification, the equivalent cycle value at each time point when the battery capacity was measured was calculated. The equivalent cycle value was defined as described above in the first verification, and was calculated in the same manner as in the first verification.

Figure 9:
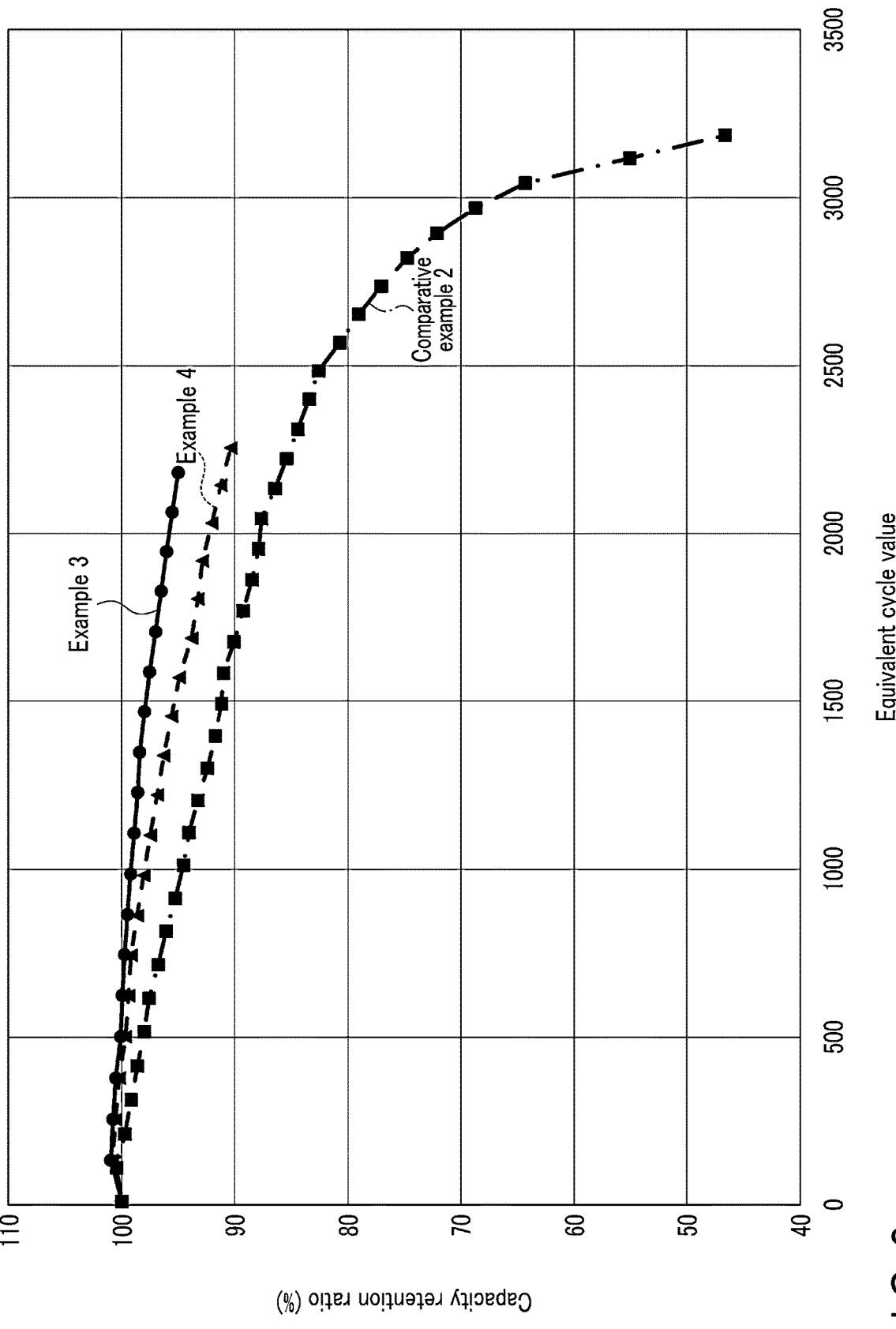
FIG. 9 is a schematic diagram illustrating a temporal change in the capacity retention ratio of the battery capacity in each of Comparative Example 2, Example 3, and Example 4 as a verification result in the second verification.

FIG. 9 illustrates a temporal change in the capacity retention ratio of the battery capacity in each of Comparative Example 2, Example 3, and Example 4 as a verification result in the second verification. In FIG. 9, the abscissa axis represents the equivalent cycle value described above, and the ordinate axis represents the capacity retention ratio of the battery capacity. In FIG. 9, the change in the capacity retention ratio in Example 3 is plotted by the solid line and circles, the change in the capacity retention ratio in Example 4 is plotted by the broken line and triangles, and the change in the capacity retention ratio in Comparative Example 2 is plotted by the alternate long and short dash line and squares.

As shown in FIG. 9 and the like, in each of Example 3 and Example 4, even when the equivalent cycle value was 2000 or more, the capacity retention ratio of the battery capacity was maintained at 90% or more. On the other hand, in Comparative Example 2, when the equivalent cycle value was about 2000, the capacity retention ratio of the battery capacity was less than 90%. In addition, by setting the ratio of the number of cycles of the charge-and-discharge cycles in the soc range Xυ to the number of cycles of the charge-and-discharge cycles in the Soc range Xμ to a value closer to 1 in Example 3 than in Example 4, a decrease in the capacity retention ratio was suppressed more than that in Example 4.

From the second verification described above, it has been demonstrated that in a battery in which lithium iron phosphate is used as a positive electrode active material, the progress of deterioration of the battery is accelerated when charging and discharging are continued only in an SOC range corresponding to the vehicle SOC range described above. In addition, it has been demonstrated that the progress of deterioration of the battery is appropriately reduced by sequentially switching the SOC range selected as the operation soc range between the SOC range corresponding to the vehicle SOC range and the SOC range corresponding to the non-vehicle SOC range. In addition, it has been demonstrated that the progress of deterioration of the battery is further appropriately reduced by bringing the ratio of the operation time in the SOC range corresponding to the non-vehicle SOC range to the operation time in the SOC range corresponding to the vehicle SOC range close to 1.

In at least one embodiment or at least one example, one of the plurality of SOC ranges shifted from each other is selected as the operation SOC range, and the battery is operated in the SOC range selected as the operation SOC range. The SOC range selected as the operation SOC range is sequentially switched between the plurality of SOC ranges. As a result, in a usage mode in which the battery is charged and discharged in the soc range whose SOC width is relatively small, it is possible to provide an operation method, an operation device, an operation system, and an operation program of the battery in which the battery is appropriately operated while appropriately reducing the progress of deterioration of the battery.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An operation method of a battery, the method comprising:

selecting one of a plurality of SOC ranges shifted from each other as an operation SOC range, and operating the battery in an SOC range selected as the operation SOC range;

sequentially switching an SOC range to be selected as the operation SOC range between the plurality of SOC ranges; and setting a vehicle SOC range and a non-vehicle SOC range as the plurality of SOC ranges shifted from each other in regard to a battery mounted on the vehicle, wherein electric power is supplied to a drive mechanism of the vehicle from the battery by operating the battery with the vehicle SOC range as the operation SOC range when a condition for permitting electric power supply from the battery to an outside of the vehicle is not satisfied, and wherein electric power is input from the outside of the vehicle to the battery and electric power is supplied from the battery to the outside of the vehicle by operating the battery with the non-vehicle SOC range as the operation SOC range when the condition for permitting the electric power supply from the battery to the outside of the vehicle is satisfied.

2. The operation method according to claim 1, further comprising setting the plurality of SOC ranges so as to be in a state in which between the plurality of SOC ranges, median SOC values are different, the upper limit SOC values are different, and lower limit SOC values are different.

3. The operating method according to claim 2, wherein the setting includes setting a first SOC range in setting of the plurality of SOC ranges, and setting at least one of a second SOC range in which the median SOC value is higher than the upper limit SOC value of the first SOC range and a third SOC range in which the median SOC value is lower than the lower limit SOC value of the first SOC range.

4. The operation method according to claim 2, wherein the setting includes making an SOC width from the upper limit SOC value to the lower limit SOC value same between the plurality of SOC ranges in setting the plurality of SOC ranges.

5. The operation method according to claim 2, wherein in setting of the plurality of SOC ranges, the lower a SOC range is among the plurality of SOC ranges, the larger an SOC width from the upper limit SOC value to the lower limit SOC value is made.

6. The operation method according to claim 2, wherein the setting includes at least one of setting the upper limit SOC value in a highest SOC range highest among the plurality of SOC ranges to any SOC value from 95% to 100% and setting the lower limit SOC value in a lowest SOC range lowest among the plurality of SOC ranges to any SOC value from 0% to 5% in setting of the plurality of SOC ranges.

7. The operation method according to claim 1, wherein the setting includes setting each of a median SOC value, an upper limit SOC value, and a lower limit SOC value higher in the vehicle SOC range than in the non-vehicle SOC range in setting the vehicle SOC range and the non-vehicle SOC range.

8. The operation method according to claim 7, wherein the setting includes setting the lower limit SOC value in the vehicle SOC range to the upper limit SOC value or more in the non-vehicle SOC range in setting the vehicle SOC range and the non-vehicle SOC range.

9. An operation device of a battery, the operation device comprising a processor configured to perform the operation method according to claim 1.

10. An operation system of a battery, the operation system comprising:

the operation device according to claim 9; and the battery operated in an SOC range selected by the processor as the operation SOC range among the plurality of SOC ranges, the operation SOC range being sequentially switched between the plurality of SOC ranges.

11. A non-transitory storage medium storing an operation program of a battery, the operation program causing a computer to execute the operation method according to claim 1.

12. An operation method of a battery, the method comprising:

selecting one of a plurality of SOC ranges shifted from each other as an operation SOC range, and operating the battery in an SOC range selected as the operation SOC range;

sequentially switching an SOC range to be selected as the operation SOC range between the plurality of SOC ranges, wherein the switching includes switching an SOC range to be the operation SOC range in response to a prescribed period or more having elapsed from a time of starting an operation in an SOC range selected as the operation SOC range, or in response to an integrated value of an amount of electric power input to and output from the battery from a time of starting an operation in an SOC range selected as the operation SOC range being a prescribed amount of electric power or more, and the SOC range selected as the operation SOC range is different before and after the switching.

13. The operation method according to claim 12, further comprising setting the plurality of SOC ranges so as to be in a state in which between the plurality of SOC ranges, median SOC values are different, the upper limit SOC values are different, and lower limit SOC values are different.

14. The operating method according to claim 13, wherein the setting includes setting a first SOC range in setting of the plurality of SOC ranges, and setting at least one of a second SOC range in which the median SOC value is higher than the upper limit SOC value of the first SOC range and a third SOC range in which the median SOC value is lower than the lower limit SOC value of the first SOC range.

15. The operation method according to claim 13, wherein the setting includes making an SOC width from the upper limit SOC value to the lower limit SOC value same between the plurality of SOC ranges in setting the plurality of SOC ranges.

16. The operation method according to claim 13, wherein in setting of the plurality of SOC ranges, the lower a SOC range is among the plurality of SOC ranges, the larger an SOC width from the upper limit SOC value to the lower limit SOC value is made.

17. The operation method according to claim 13, wherein the setting includes at least one of setting the upper limit SOC value in a highest SOC range highest among the plurality of SOC ranges to any SOC value from 95% to 100% and setting the lower limit SOC value in a lowest SOC range lowest among the plurality of SOC ranges to any SOC value from 0% to 5% in setting of the plurality of SOC ranges.

18. An operation device of a battery, the operation device comprising a processor configured to perform the operation method according to claim 12.

19. An operation system of a battery, the operation system comprising:

the operation device according to claim 18; and the battery operated in an SOC range selected by the processor as the operation SOC range among the plurality of SOC ranges, the operation SOC range being sequentially switched between the plurality of SOC ranges.

20. A non-transitory storage medium storing an operation program of a battery, the operation program causing a computer to execute the operation method according to claim 12.

* * * * *